United States Patent [19]
Yamamoto et al.

[11] Patent Number: 5,259,272
[45] Date of Patent: Nov. 9, 1993

[54] CONTROL DEVICE FOR CONTINUOUSLY VARIABLE TRANSMISSION FOR VEHICLES AND METHOD OF CONTROLLING THE SAME

[75] Inventors: Hiroaki Yamamoto, Hyogo; Yoshinori Yamashita; Katsuhiko Taniguchi, both of Shizuoka, all of Japan

[73] Assignees: Mitsubishi Denki K.K., Tokyo; Suzuki Motor Corp., Shizuoka, both of Japan

[21] Appl. No.: 951,115

[22] Filed: Sep. 25, 1992

[30] Foreign Application Priority Data

Sep. 27, 1991 [JP] Japan .................. 3-276576
Nov. 20, 1991 [JP] Japan .................. 3-304675
Nov. 20, 1991 [JP] Japan .................. 3-304676

[51] Int. Cl.$^5$ ............................. F16H 61/02
[52] U.S. Cl. ................................ 74/866
[58] Field of Search ......................... 74/866

[56] References Cited

U.S. PATENT DOCUMENTS

| | | | |
|---|---|---|---|
| 4,458,318 | 7/1984 | Smit et al. | 364/424.1 |
| 4,475,416 | 10/1984 | Underwood | 74/868 |
| 4,619,629 | 10/1986 | Shigematsu | 474/28 |
| 4,673,378 | 6/1987 | Tokoro et al. | 474/18 |
| 4,714,451 | 12/1987 | Yoshida et al. | 474/28 |
| 4,718,308 | 1/1988 | Haley | 74/866 |
| 4,734,082 | 3/1988 | Tezuka | 474/28 |
| 4,759,236 | 7/1988 | Tezuka et al. | 74/866 |
| 4,819,514 | 4/1989 | Yamamuro et al. | 74/868 |
| 4,827,804 | 5/1989 | Tezuka et al. | 74/866 |
| 4,916,982 | 4/1990 | Suzuki | 74/866 |
| 5,042,325 | 8/1991 | Sawasaki et al. | 74/866 |
| 5,050,457 | 9/1991 | Takayama et al. | 74/866 |
| 5,052,980 | 10/1991 | Itoh et al. | 474/11 |
| 5,056,380 | 10/1991 | Sawasaki et al. | 74/866 |
| 5,063,815 | 11/1991 | Oshidari | 74/866 |
| 5,085,107 | 2/1992 | Tatara | 74/866 |
| 5,088,352 | 2/1992 | Ishimaru | 74/867 |
| 5,157,992 | 10/1992 | Hayashi et al. | 74/866 |
| 5,203,233 | 4/1993 | Hattori et al. | 74/865 |

FOREIGN PATENT DOCUMENTS

57-186656 11/1982 Japan .
59-43249 3/1984 Japan .
59-77159 5/1984 Japan .
61-233256 10/1986 Japan .
1-119433 5/1989 Japan .

Primary Examiner—Dirk Wright
Attorney, Agent, or Firm—Sughrue, Mion, Zinn, Macpeak & Seas

[57] ABSTRACT

In a continuously variable transmission of the type in which a speed change ratio is changed in a manner that the radius of rotation of a belt wound around a drive pulley and a driven pulley is varied by changing the width of a groove between the pulley parts of each pulley with an oil pressure. A control means for controlling an oil pressure in various control modes shifts the control mode from a hold mode to a start mode, when a driver manipulates a vehicle carrying the continuously variable transmission with his intention to start the vehicle, and an amount of discharge flow of an oil pump for generating an oil pressure exceeds a preset value. The safety factor in a stationary state is calculated using the effective tension of the CVT belt, secondary side oil pressure, and the speed change ratio. Using the calculated stationary state safety factor, a manipulated variable previously gained, and a changing rate of the primary oil pressure, a safety factor in a speed change state (transient state) is calculated. A manipulated variable of the speed change control means is limited so that the safety factor in a speed changing state exceeds a predetermined value. When the speed change performance may be damaged with the limitation of manipulated variable, a necessary quantity of the line pressure or the CVT input torque is corrected so as to increase the limit value.

4 Claims, 14 Drawing Sheets

CONTROL DEVICE FOR CONTINUOUSLY VARIABLE TRANSMISSION FOR VEHICLES AND METHOD OF CONTROLLING THE SAME

BACKGROUND OF THE INVENTION

1. Field of the Invention

The present invention relates to a control device for a continuously variable transmission, which is used as a vehicle power transmission device, and a method of controlling the continuously variable transmission.

2. Discussion of the Prior Art

In vehicles, a drive force generated by an internal combustion engine is transmitted to the driving wheels, through a transmission. The transmission changes the drive force to be transmitted to the driving wheels in accordance with the vehicle running conditions changing in a broad range, whereby bringing out the best performances of the internal combustion engine. The transmission is generally categorized into a gear transmission in which a speed change ratio is stepwise changed by selectively switching gears of the gear train, and a continuously variable transmission (CVT) in which a speed change ratio is continuously changed by changing the radius of rotation of a belt wound around pulleys.

In some types of CVT, a belt is wound around a drive pulley and a driven pulley. The width of a groove between the pulley parts of each pulley is changed by an oil pressure, thereby to change the radius of rotation of the belt. With the change of the rotation radius, a speed change ratio is continuously changed. In the CVT, a control device controls an oil pressure according to a control mode selected from among various control modes, thereby to change the speed change ratio. The CVT is provided with an oil pressure clutch. In the clutch, a coupling state and a decoupling state are selectively set up for the various control modes by controlling an oil pressure by means of the control device. For the details of the CVT, reference is made to Japanese Patent Laid-Open Publication Nos. Sho. 57-186656, 59-43249, 59-77159, and 61-233256.

In the CVT, when the controls of a line pressure as an oil pressure and a clutch pressure start immediately after the control mode is shifted from a hold mode to a start mode, with the calculating operation of the control device and retardation of increasing an oil pressure up to a predetermined oil pressure, the control system of the vehicle often fails to secure a line pressure necessary for the clutch pressure control.

Japanese Patent Laid-Open Publication No. Hei. 1-119433 discloses a technique to secure a sufficient line pressure. In the technique, the control of the clutch pressure in a start mode is delayed in its starting, when the control mode is shifted from the hold mode to the start mode.

In the internal combustion engine carried on the vehicle, the number of idling revolutions is, for example, 700 to 900 rpm in a complete warming-up state. In the conventional control method, when the vehicle is manipulated for start under the condition that the internal combustion engine runs at the idling speed, the control mode is shifted from the hold mode to the start mode even if the engine speed is equal to the idling speed. A line pressure as an oil pressure that is required in the start mode is at least 15 kg/cm$^2$.

At low engine speeds, e.g., idling speeds, a discharge flow from the oil pump is small. Therefore, it is impossible to gain an oil pressure necessary for the control for vehicle start. Accordingly, the CVT can be unsatisfactorily controlled, so that the running feeling at the start of vehicle is impaired.

As shown in FIGS. 1 through 4, in a low speed region (A) of the engine speeds NE, the discharge flow of the oil pump is insufficient. Under this condition, there occurs a region where a line pressure cannot follow a line pressure solenoid duty OPWLIN. Such a region will impair the running feeling at the start of vehicle. In the start mode, the line pressure solenoid duty OPWLIN becomes high to increase the load to the internal combustion engine. This impedes the increase of the engine speed. As a result, the running feeling is further deteriorated at the start of vehicle.

This will be described in more detail. In FIG. 4, a driver pushes his foot down on the accelerator pedal. Then, the driver demand switch DDT is turned on. Immediately after the switch is turned on, the control mode is shifted from the hold mode HLD to the normal start mode NST. When the driver demand switch DDT is off, the internal combustion engine is in an idling state, and the engine speed is within the range from 700 to 900 rpm. Accordingly, the engine speed keeps the idling speed for a period of time after the driver demand switch DDT is turned on.

The control system of the vehicle recognizes the driver's intention to start a vehicle on the basis of only the turn-on of the driver demand switch DDT. However, there is a case where the on-state of the switch DDT does not indicate the driver's intention to start a vehicle. For example, when a driver merely puts his foot on the accelerator pedal, the switch DDT is turned on like the rest. The control system of the vehicle mistakenly recognizes that the driver will start the vehicle.

Additionally, increase of the line pressure results in increase of the load to the internal combustion engine. If the control system is designed so that the line pressure is increased at low engine speeds NE, the engine sometimes fails to reach an engine speed NE high enough to control the normal start mode NST. Particularly in the internal combustion engine of low power performances, such a situation tends to occur sensitive to nonuniformity of the engine performances of the engines used. This also impairs the driving feeling at the start of vehicle.

As shown in FIG. 1, in the low region A of the engine speed NE, the amount of discharge flow of the oil pump is not sufficient. At the low engine speeds A, even if the line pressure solenoid duty OPWLINE is increased, the line pressure fails to follow the increasing line-pressure solenoid duty OPWLIN, as shown in FIGS. 2 and 3. This causes the unsatisfactory driving feeling at the start of vehicle. The speed change ratio of the CVT is controlled in a feedback mode so that actual engine speeds are equal to desired engine speeds that depend on the running conditions of a vehicle. The control gains are determined so that the actual engine speeds follow the desired engine speeds. At the time of rapid acceleration or deceleration, greater variation of control factors transiently occurs. With this transient great variation, an amount of manipulation is too large to be covered by the follow-up capability of the CVT. Under this condition, the belt will slip. Increase of belt gripping force may remove the transient belt slip. The excessive gripping force constantly applied brings about reduction of the lifetime of the belt and increase of fuel consumption, however.

SUMMARY OF THE INVENTION

With the view of overcoming the problems as mentioned above, the present invention has an object to provide a method of controlling a continuously variable transmission which can secure an oil pressure necessary for the control for vehicle start, can exactly reflect a driver's intention for vehicle start on the control, and can remove the adverse effects by the nonuniform engine performances of the engines used, whereby improving the running feeling at the start of vehicle.

To achieve the above object, there is provided a continuously variable transmission in which a speed change ratio is changed in a manner that the radius of rotation of a belt wound around a drive pulley and a driven pulley is varied by changing the width of a groove between the pulley parts of each pulley with an oil pressure, wherein, in the case of that a driver manipulates a vehicle having the continuously variable transmission with his intention to start the vehicle, a control device for controlling an oil pressure in various control modes shifts the control mode from a hold mode to a start mode when an amount of discharge flow of an oil pump for generating an oil pressure exceeds a preset value.

Another object of the invention is to provide a control device for a continuously variable transmission for vehicles which can solve the problems of belt slip and reduction of belt lifetime caused by the excessive gripping force of belt, and can control a speed change ratio while keeping the excellent follow-up performance of the transmission.

The relationship between a belt tension and a belt gripping force caused by a pressure applied to between the pulley parts of the drive pulley will cause the belt slip. In an equilibrium state where the speed change ratio is substantially constant, the belt slip is generally expressed by the following equations. Where the primary side (engine side) is a driving section and the secondary side (wheel shaft side) is a driven section, the gripping force F1 of the input shaft side (=primary side) is given by an equation (1)

$$F_1 = \frac{T_{eff} \cdot \cos\beta}{2\mu} \left\{ 1 + \frac{\mu(\alpha_1 - \phi)A}{(A - 1)\sin\beta} \right\} \quad (1)$$

And the gripping force F2 of the output shaft (=secondary side) is given by an equation (2)

$$F_2 = \frac{T_{eff} \cdot \cos\beta}{2\mu} \left\{ 1 + \frac{\mu(\alpha_2 - \phi)A}{(A - 1)\sin\beta} \right\} \quad (2)$$

where
$A = \exp(\mu \cdot \phi / \sin \beta)$
Teff: effective belt tension $= M1/R1$
M1: primary torque
$\alpha_1, \alpha_2$: belt contact angle
$\beta$: sheave vertical angle
R1: radius of the belt on the primary side
$\mu$: friction coefficient between the pulley and the belt
$\phi$: angle defining a variation of the belt tension between the maximum and minimum values at a position where the pulley contacts with the belt.

If $\phi \leq \alpha_1$ or $\phi \leq \alpha_2$, the belt slip will not occur. Contrary, if $\phi > \alpha_1$ or $\phi > \alpha_2$, the belt slip will occur. In each of the equations (1) and (2), it can be considered that the first term indicates the minimum belt gripping force to prevent the belt from slipping, and the value within the braces { } indicates a factor of safety. The speed change ratio Rc=R2/R1 (R2=belt radius of the secondary sides) is determined by the ratio of the gripping forces F1 and F2 (thrusts of the shafts) (i.e., the ratio of the safety factor), and the safety factors, as shown in FIG. 5. In the figure, there is illustrated the relationship among the safety factors in the primary and secondary sides, and the speed change ratio Rc.

In the continuously variable transmission, the speed change ratio is controlled in a manner that the second gripping force F2 is secured with a line pressure controlled so as to prevent the belt slip, and the primary side oil pressure, or the first gripping force F1, is controlled so as to obtain a desired engine speed.

FIG. 6 shows an oil pressure circuit related to the speed change. In the circuit, the gripping forces F1 and F2, if the centrifugal oil pressure is neglected, are expressed by $$F_1 = P_1 \cdot S_1 \quad (3)$$

$$F_2 = P_2 \cdot S_2 \quad (4)$$

From the principle of continuity of flow, we have a flow rate Q1 of the first oil path 38 and a flow rate Q2 of the second oil path 28, that are given by equations (5) and (6), respectively $$Q_1 = S_1 \frac{dx_1}{dt} + \frac{V_1}{B} \cdot \frac{dP_1}{dt} \quad (5)$$

$$Q_2 = S_2 \frac{dx_2}{dt} + \frac{V_2}{B} \cdot \frac{dP_2}{dt} \quad (6)$$

From the control valve and the conduit resistance in a down shift mode, we have the following equations (5) and (6)

$$-P_1 = \frac{8\pi \cdot \rho \cdot \nu \cdot L_1}{A_1^4} + \frac{\rho}{2Ca \cdot Aa} Q_1 \cdot |Q_1| \quad (7)$$

$$-Q_2 = \frac{A_1^4}{8\pi \cdot \rho \cdot \nu \cdot L_2} (P_1 - P_2) \quad (8)$$

where
x1 and x2: positions of the movable pulley parts 16 and 20 of the pulley respectively in the primary and secondary sections
P1 and P2: pressures in the first and second oil chambers 26 and 28
S1 and S2: pressure receiving areas of the primary and secondary movable pulley parts 16 and 20
V1 and V2: volumes of the first and second oil chambers 26 and 28
B: modulus of elasticity of volume of the oil
L1 and L2: equivalent conduit lengths of the first and second line oil paths 38 and 40
A1 and A2: equivalent cross sectional areas of the first and second line oil paths 38 and 40
$\rho$ and $\nu$: density and kinetic viscosity
Aa and Ca: opening area and a flow coefficient of a port a of the primary oil pressure control valve 42. The opening area Aa is the function of the difference between a duty in an equilibrium state (=actual neutral value) and a duty. When the duty is the actual neutral value, the opening area Aa is zero.

As the difference becomes large, the opening area Aa also becomes large.

P1: line pressure.

The velocity dx/dt of the moving pulley is proportional to the difference between the gripping forces F1 and F2 (equations (3) and (4)) which are out of the equations (1) and (2) in an equilibrium state. Accordingly, under a certain condition, we have $dP_1/dt \approx 0$ when the equations (1) to (8) are rearranged. Typical step responses of the primary oil pressure P1 of an actual machine in a down shift mode are illustrated in FIG. 7, with parameters of duties as manipulated variables. In the speed change control, $dx/dt = 0$ is set up when a new equilibrium is reached or a positional limit is reached. In a new equilibrium state, the primary oil pressure P1 takes such a value as to provide the first gripping force F1 as defined by the equation (1) or (3). When a positional limit is reached, the primary oil pressure P1 becomes zero, but the gripping force is sustained with a reaction force from the stopper.

As a changing velocity of the speed change ratio becomes higher, viz., the actual neutral value of duty becomes larger, a transient (when the pulleys are moving) primary pressure P1 becomes lower. When it is lowered to fail to secure the minimum belt gripping force given by the equation (1), the belt slip occurs. Therefore, to prevent the belt slip, it is necessary to limit the duty of the manipulated variable so that the primary oil pressure P1 in a down shift mode takes at least a value able to secure the minimum belt gripping force of the equation (1). Also in this case, deterioration of the drivability should be avoided.

According to a second aspect of the invention, there is provided a control device for a continuously variable transmission comprising first calculating unit for calculating a minimum belt gripping force value using an effective belt tension as the ratio of a transmission torque to the effective diameter of the pulley, third calculating unit for calculating a first gripping force value in an equilibrium using the minimum belt gripping force value, a second gripping force value calculated by second calculating unit, and a speed change ratio, determining unit for determining the relationship of a change rate of the first gripping force and a manipulated variable of a speed change control unit, fourth calculating unit for calculating a second gripping force value in a speed changing state using the determined relationship and the output data from the third calculating unit, limiting unit for limiting the manipulated variable of the speed change control unit so that the ratio of the output data of the fourth calculating means to the output data of the first calculating unit exceeds a fixed value, and correcting unit for correcting an input torque of the continuously variable transmission according to the manipulated variable limiting data of the speed change control unit.

Alternatively, the control device thus arranged comprises another correcting unit for correcting a line pressure according to the manipulated variable limiting data of the speed change control unit, in place of the input torque correcting unit.

In the control device for a continuously variable transmission, the control device operates to shift the control mode from a hold mode to a start mode, when a driver manipulates a vehicle carrying the continuously variable transmission with his intention to start the vehicle, and an amount of discharge flow of an oil pump for generating an oil pressure exceeds a preset value.

In other words, when a driver pushes his foot on the accelerator pedal of a vehicle carrying the continuously variable transmission with his intention to start the vehicle, the engine speed increases to exceed a preset value, so that an amount of discharge flow of an oil pump for generating an oil pressure exceeds a preset value at which an oil pressure necessary for control is secured, the control means operates to shift the control mode from a hold mode to a start mode. Thus, when the control mode is shifted to the start mode, an amount of discharge flow of an oil pump for generating an oil pressure has exceeded a preset value at which an oil pressure necessary for control is secured, as the result of increase of the engine speed. Accordingly, an oil pressure necessary for control can be reliably secured.

In the second aspect of the invention, the primary safety factor in an equilibrium state is obtained from the relationship between a speed change ratio and a secondary safety factor determined by the secondary oil pressure (=line pressure) and the input torque. The secondary safety factor in a transient state (=safety factor in an equilibrium state × attenuation factor of the primary safety factor) is obtained from the relationship between an actual neutral value of duty previously obtained and a primary oil pressure attenuation factor, or an attenuation factor of the primary safety factor. The duty of a manipulated variable of the speed change control means is limited to such a value that the primary safety factor is at least a preset value. When a deviation becomes large as the result of limiting the manipulated variable, a CVT input torque or a line pressure is corrected to lessen the limitation of the manipulated variable.

BRIEF DESCRIPTION OF THE DRAWINGS

Other objects, features, and advantages of the present invention will be apparent from the detailed description of the invention in connection with the accompanying drawings, in which.

DETAILED DESCRIPTION OF THE PREFERRED EMBODIMENTS

First Embodiment

The preferred embodiments of the present invention will be described with reference to the accompanying drawings.

Figure 9:
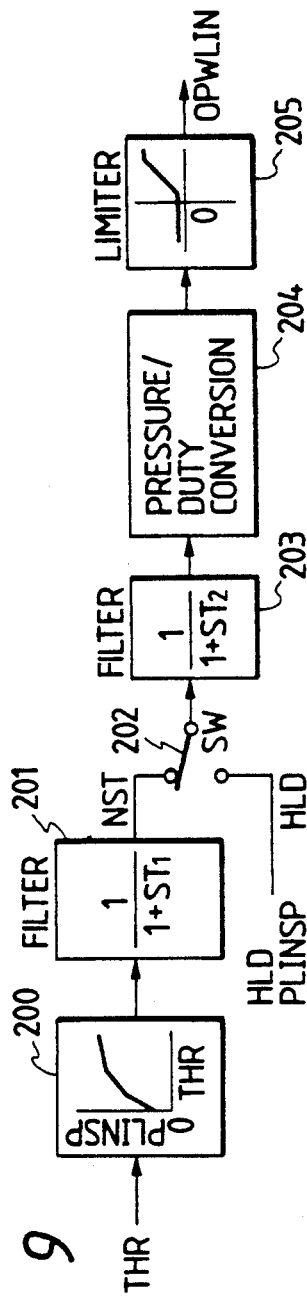
FIG. 9 is a block diagram showing the control flow by a CVT control method according to the present invention.
Figure 10:
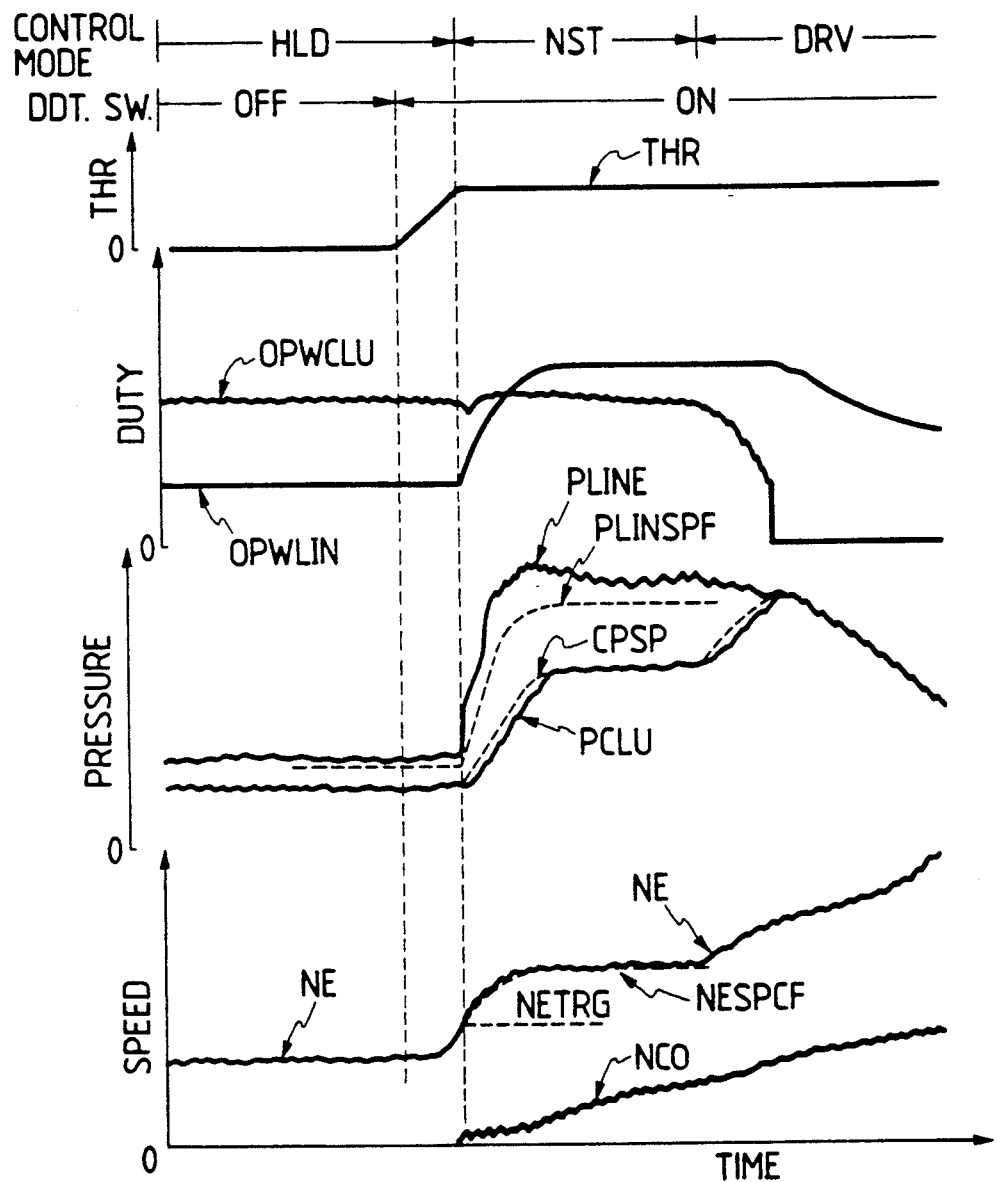
FIG. 10 is a timing chart showing a control method of controlling a continuously variable transmission according to the invention.
Figure 11:
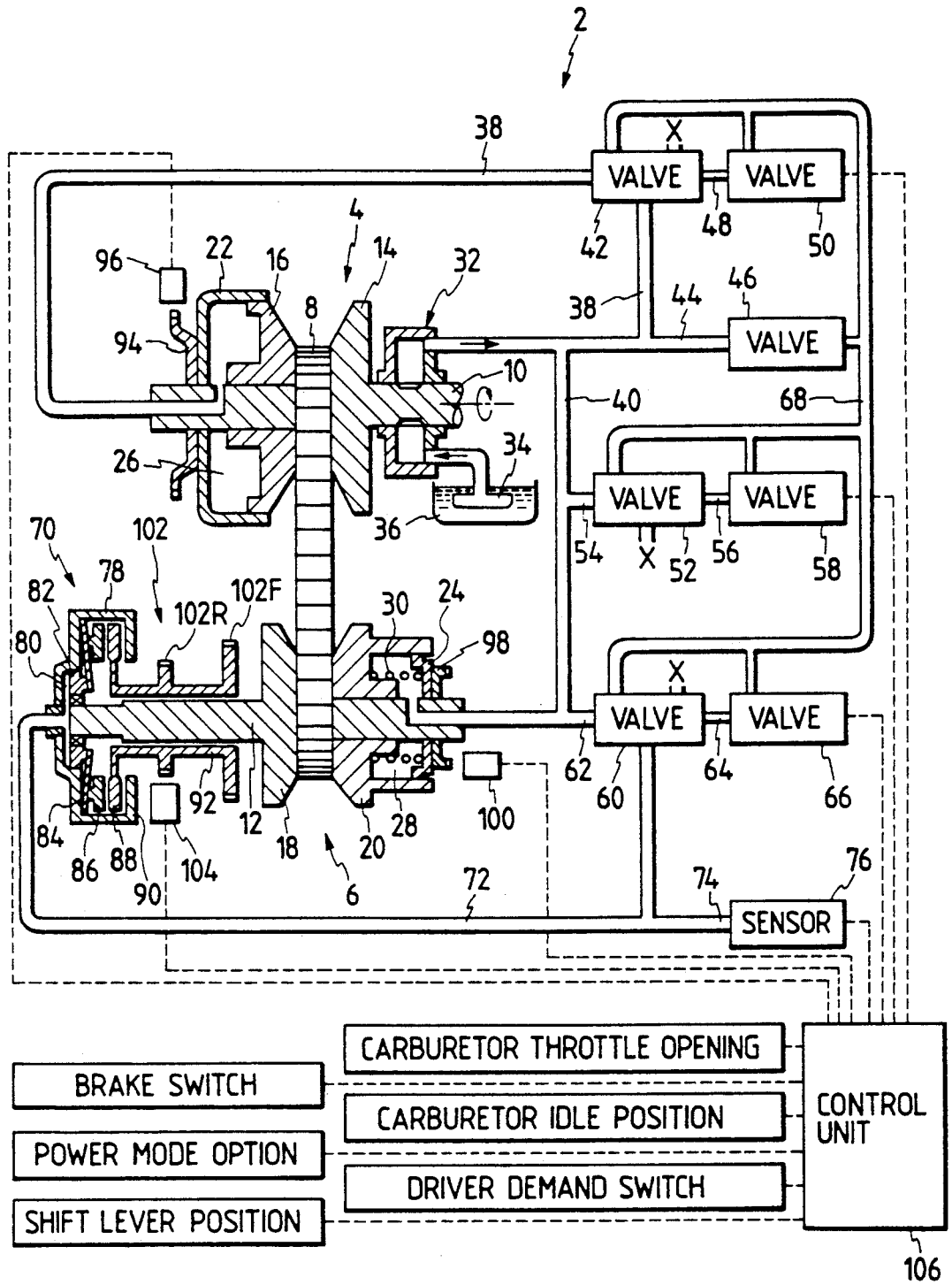
FIG. 11 is a view schematically showing a continuously variable transmission according to the invention.

FIGS. 8 to 11 are provided for explaining an embodiment of the present invention. FIG. 11 is a view schematically showing the construction of a continuously variable transmission (CVT). In FIG. 11, reference numeral 2 designates a belt-drive CVT; 4 designates a drive pulley; 6 a driven pulley; 8, a belt; 10, an input shaft; and 12, an output shaft.

The drive pulley 4 includes a fixed pulley part 14 securely mounted on the input shaft 10 as a rotating shaft, and a movable pulley part 16 which is mounted on the input shaft 10 in a manner that it is slidable in the axial direction but is unrotative about the input shaft. The driven pulley 6, like the drive pulley 4, includes a fixed pulley part 18 fixedly mounted on the output shaft 12 as a rotating shaft and a movable pulley part 20 which is mounted on the output shaft 12 in a manner that is movable in the axial direction of the output shaft 12 but is unrotative about the output shaft.

A first housing 22 is mounted to the movable pulley part 16, thereby forming a first oil pressure chamber 26. A second housing 24 is mounted to the movable pulley part 20, thereby forming a second oil pressure chamber 28. An urging means 30, such as a spring, is installed within the second oil pressure chamber 28. The urging means 30 urges the movable pulley part 20 in the direction to reduce the width of a groove between the fixed pulley part 18 and the movable pulley part 20.

An oil pump 32 is formed around the input shaft 10. The suction port of the oil pump 32 communicates with an oil pan 36 by way of an oil filter 34. The discharge port of the oil pump 32 communicates with the first and second oil pressure chambers 26 and 28 respectively through first and second oil paths 38 and 40. A primary pressure control valve 42 for controlling the primary pressure as a sheave pressure for the input shaft is inserted in the first oil path 38.

The second oil path 40, which is closer to the oil pump 32 than the primary pressure control valve 42, communicates through a third oil path 44 with a fixed pressure control valve 46 for controlling a line pressure (normally 5 to 25 kg/cm$^2$) to a control oil pressure at a fixed pressure (3 to 4 kg/cm$^2$). The primary pressure control valve 42 also communicates with a first three-way electromagnetic valve 50 through a fourth oil path 48. The electromagnetic valve 50 is provided for controlling the primary pressure.

A line pressure control valve 52 with an escape valve function, which is for controlling a line pressure as a pump pressure, communicates with the second oil path 40 through a fifth oil path 54. The line pressure control valve 52 communicates through a sixth oil path 56 to a three-way electromagnetic valve 58 for line-pressure control.

A clutch pressure control valve 60, which is for controlling a clutch pressure as an oil pressure exerting on an oil clutch 70 to be given later, communicates through a seventh oil path 62 with a location of the second oil path 40, where is closer to the second oil pressure chamber 28 than the location of the second oil path where it communicates with the line pressure control valve 52. The clutch pressure control valve 60 communicates through an eighth oil path 64 a three-way electromagnetic valve 66 for clutch pressure control.

The primary pressure control valve 42, first three-way electromagnetic valve 50, line pressure control valve 52, three-way electromagnetic valve 58, clutch pressure control valve 60, and three-way electromagnetic valve 66 are interconnected by a ninth oil path 68, in order that the fixed control oil pressure derived from the fixed pressure control valve 46 is applied to those valves.

The clutch pressure control valve 60 communicates through a tenth oil path 72 with a clutch oil chamber 80 (to be described later) of the oil clutch 70. The tenth oil path 72 is connected through an eleventh oil path 74 to a pressure sensor 76. The pressure sensor 76 directly senses an oil pressure when a clutch pressure is controlled in a hold mode, a start mode, or the like. The pressure sensor participates in giving an instruction to set the sensed oil pressure to a desired clutch pressure. In a drive mode, the clutch pressure is equal to the line pressure. Accordingly, it contributes to a line pressure control.

The oil clutch 70 is composed of an input casing 78 mounted on the output shaft 12, a clutch oil pressure chamber 80 provided within the input casing 78, a piston 82, which is pushed forward by an oil pressure acting on the clutch oil chamber 80, a ring-shaped spring 84 for urging the piston 82 backwardly, a first pressure plate 86 moved forwardly and backwardly with the pushing force by the piston 82 and the urging force by the ring-shaped spring 84, an output friction plate 88, and a second pressure plate 90 fastened to the input casing 78. The output friction plate 88 is mounted to a final output shaft 92.

When a clutch pressure as an oil pressure acting on the clutch oil chamber 80 is increased in the oil clutch 70, the piston 82 is pushed forwardly to press the first and second plates 86 and 90 against the output friction plate 88. As a result, those are placed in a coupling state. When the clutch pressure as the oil pressure acting on the clutch oil chamber 80 is decreased, the piston 82 is moved backwardly by the urging force of the ring-shaped spring 84, so that the first and second plates 86 and 90 are separated from the output friction plate 88, that is, a called clutch decoupling state is set up. In this way, the oil clutch 70 is coupled and decoupled by the clutch pressure, thereby to allow the drive force output from the CVT 2 to be transmitted to the final output shaft 92 and to prohibit the drive force from being transmitted to the output shaft.

An input-shaft rotation detecting gear 94 is provided outside the first housing 22. A first rotation detector 96 is provided near to the outer periphery of the final output shaft 92. An output-shaft rotation detecting gear 98 is provided outside the second housing 24. A second rotation detector 100 is provided near to the outer periphery of the output-shaft rotation detecting gear 98. The speed of the engine and the belt ratio (speed change ratio) are detected from the number of revolutions detected by the first and second rotation detectors 96 and 100.

An output gear 102 is provided on the final output shaft 92 having the output friction plate 88 of the oil clutch 70. The output gear 102 includes a forward output gear 102F and a backward output gear 102R, which are respectively in mesh with a forward switch gear and a backward switch gear of a switch gear (not shown). A third rotation sensor 104 is provided in the vicinity of the outer periphery of the backward output gear 102R of the output gear 102. The sensor 104 detects the number of clutch output revolutions as the number of revolutions of the final output shaft 92. The third rotation sensor 104 detects the number of clutch output revolutions of the final output shaft 92, which is coupled with the driving wheels, through the forward/rearward switch mechanism, intermediate shaft, final reduction gear, differential mechanism, and drive shaft. Accordingly, it can detect the speed of the driving wheels. The clutch input speed and the clutch output speed, which are respectively at the input and output of the oil clutch 70, can also be detected depending on the numbers of revolutions, which are output from the second rotation detector 100 and the third rotation detector 104. This contributes to detection of a clutch slip quantity.

A control unit 106 as a control means for controlling the CVT 2 is provided, which receives various types of signals, such as signals output from the pressure sensor 76, and the first to third rotation detectors 96, 100, and 104, and a carburetor throttle opening signal, carburetor idle position signal, accelerator pedal signal, brake signal, power mode option signal, and shift lever position signal.

The control unit 106 controls the first three-way electromagnetic valve 50 for primary pressure control, threeway electromagnetic valve 58 for line pressure control, and three-way electromagnetic valve 66 for clutch pressure control.

The input signals to the control unit 106 will be given below.

1) Shift lever position signal

It contains range signals of P, R, N, D, L and the like. The line pressure, ratio and clutch that are required for each range are controlled with these signals.

2) Carburetor throttle opening signal

The signal is used for determining a desired ratio or a desired engine speed with reference to an engine torque read out of a memory storing programmed engine torques.

3) Carburetor idle position signal

The signal is used for correcting and controlling a carburetor throttle opening sensor.

4) Driver demand switch signal

The signal represents a state of pushing down the accelerator pedal, or a driver's will. With the signal, a control mode is determined when the vehicle starts or is running.

5) Brake signal

The signal represents whether or not a driver pushes down the brake pedal. The signal is used for controlling the oil clutch for the release of a clutch, for example.

6) Power mode option signal

The signal is used for optionally setting the vehicle operation to a sporty mode (or economy mode).

Four basic modes are provided for controlling the clutch pressure of the oil clutch 70 by the control unit 106.

1) Neutral mode

In the mode, the shift position is at N or P. When the oil pressure clutch is perfectly disengaged, the clutch pressure is at the minimum level (0).

2) Hold mode

When the shift position is at D, L, or R and a driver releases the accelerator pedal with no intention to drive, or when a driver decelerates the vehicle to interrupt the transmission of the engine torque, the clutch pressure takes such a low value as to allow the clutch to make an engagement.

3) Start mode (special start mode)

When the vehicle is started (in a normal start mode) or when after the release of the oil pressure clutch, the oil pressure clutch is coupled again (special start mode), the clutch pressure is set to such a proper level as to prevent the blow-by of the engine and to provide an engine torque (clutch input torque) large enough to ensure a smooth motion of the vehicle.

4) Drive mode

When the vehicle operation enters a stable running phase with the perfect coupling state of the clutch, the clutch pressure is high enough to withstand the engine torque.

The CVT 2 includes the primary pressure control valve 42 as the oil pressure control valve means for controlling the oil pressure for changing a speed change ratio, and the first three-way electromagnetic valve 50 as the oil pressure control valve for controlling an operating oil pressure of the primary pressure control valve 42. The first three-way electromagnetic valve 50 for controlling the operating oil pressure of the primary pressure control valve 42 is driven, by the control unit 106, according to a drive frequency as an output value expressed as a duty ratio. The primary pressure control valve 42, operated by the operating oil pressure, controls the speed change ratio of the CVT 2 in a continuous manner.

As described above, the CVT 2 continuously changes its speed change ratio in a manner that the radius of rotation of the belt 8 wound around both the pulleys 4 and 6 is controlled by controlling, with the oil pressure, the width of the grooves between the pulley parts of the drive and driven pulleys 4 and 6. The CVT 2 further includes the control unit 106 for controlling the oil pressure by operating the various types of control valves 42 in the respective control modes. The control unit 106 performs the control for shifting the control mode from the hold (HLD) mode to the start (NST) mode when a discharge flow of the oil pump 32 for generating an oil pressure exceeds a prescribed value in starting a stationary vehicle (not shown) with the CVT 2.

The operation of the CVT 2 thus constructed will be described.

In the CVT 2, as shown in FIG. 11, the oil pump 32 located around the input shaft 10 is operated to suck oil from the oil pan 36 through the oil filter 34. A pump pressure, or a line pressure, as a pressure of the oil discharged from the oil pump 32 is controlled by the line pressure control valve 52. The line pressure decreases when an amount of oil leaking from the line pressure control valve 52 is large, and increases when it is small. The line pressure control valve 52 controls the line pressure according to an input torque.

The line pressure control valve 52 is controlled by the three-way electromagnetic valve 58, which is exclusively used for the control valve 52. In other words, the line pressure control valve 52 operates following the operation of the three-way electromagnetic valve 58. The three-way electromagnetic valve 58 is controlled in terms of a duty ratio of a drive frequency, by the control unit 106. Specifically, at 0% of the duty ratio, the three-way electromagnetic valve 58 is in an inoperable state and accordingly the output oil pressure is zero. At 100% of the duty ratio, the three-way electromagnetic valve 58 operates and the output oil pressure is the largest, equal to the control pressure. Thus, by the three-way electromagnetic valve 58, the output oil pressure is variable according to the duty ratio.

The characteristic curve of the three-way electromagnetic valve 58 is substantially linear, allowing the line pressure control valve 52 to operate in an analog manner. The line pressure can be controlled by properly changing the duty ratio of the three-way electromagnetic valve 58.

The primary pressure for speed change ratio control is controlled by the primary pressure control valve 42. The primary pressure control valve 42 is controlled by the first three-way electromagnetic valve 50 exclusively used for the control valve 42, as the line pressure control valve 52 is controlled by the associated valve. The first three-way electromagnetic valve 50, as the three-way electromagnetic valve 58 is done, is controlled in terms of duty ratio by the control unit 106. With its control, the pressure of the oil output to the primary pressure control valve 42 is varied to control the primary pressure.

The clutch pressure control valve 60, which is for controlling the oil clutch 70, controls the clutch pressure. When the maximum clutch pressure is required, the line pressure is introduced. When the minimum clutch pressure is required, an atmospheric pressure is introduced. The clutch pressure control valve 60 is controlled in its operation by the three-way electromagnetic valve 66 as the control valves 52 and 42 are so done. Hence, no further description of it will be given.

The clutch pressure is varied between the atmospheric pressure as the minimum pressure and the line pressure as the maximum pressure. Four basic modes are provided for the clutch pressure control as follows:
1) Neutral mode
2) Hold mode
3) Start mode
4) Drive mode.

The control of the neutral mode 1) is carried out by a switch valve (not shown), which is provided exclusively for this mode, and operates in association with the shift operation. The remaining modes are based on the duty ratio control by the first to third three-way electromagnetic valves 50, 58, and 66.

In the control of the drive mode 4), the clutch pressure control valve 60 operates to connect the seventh oil path 62 with the tenth oil path 72. As a result, the maximum pressure generating state is set up, so that the clutch pressure is equal to the line pressure.

The primary pressure control valve 42, line pressure control valve 52, and clutch pressure control valve 60 are controlled with the pressures of oil output from the first to third three-way electromagnetic valves 50, 58, and 66. The control oil pressure for controlling the first to third three-way electromagnetic valves 50, 58, and 66 is a fixed pressure generated by the fixed pressure control valve 46. The control oil pressure is lower than the line pressure but is stable at a fixed value. The control oil pressure stabilizes the primary pressure control valve 42, line pressure control valve 52, and clutch pressure control valve 60.

The control of the CVT 2 will be described.

In the CVT 2 controlled by an oil pressure, a proper line pressure from the control unit 106, a primary pressure for changing the speed change ratio, and a clutch pressure for reliably coupling the oil clutch 70 are set up.

FIG. 9 is a block diagram showing the control of oil pressure in the CVT 2.

The control unit 106 calculates a desired line pressure value PLINSP from a throttle opening THR (block 200), and performs a filtering processing of $1/(1+ST1)$ (block 201), thereby obtaining a desired line pressure value PLINSP in the normal start mode NST. Similarly, it obtains a desired line pressure value PLINSP in the hold mode HLD.

When a control mode switch 202 is turned to the normal start mode NST position, the desired line pressure value PLINSP in the normal start mode NST is subjected to a filtering processing of $1/(1+ST2)$ (block 203), a pressure value is converted into a duty value (block 204), and the resultant value is passed through a limiter (block 205), which produces it in terms of a line pressure solenoid duty OPWLIN. The three-way electromagnetic valve 58 is driven according to the line pressure solenoid duty OPWLIN. When the control mode switch 202 is turned to the hold mode HLD position, the desired line pressure value PLINSP in the hold mode HLD is subjected to a filtering processing of $1/(1+ST2)$ (block 203), a pressure value is converted into a duty value (block 204), and the resultant value is passed through a limiter (block 205), which produces it in terms of a line pressure solenoid duty OPWLIN. The three-way electromagnetic valve 58 is driven according to the line pressure solenoid duty OPWLIN.

Figure 8:
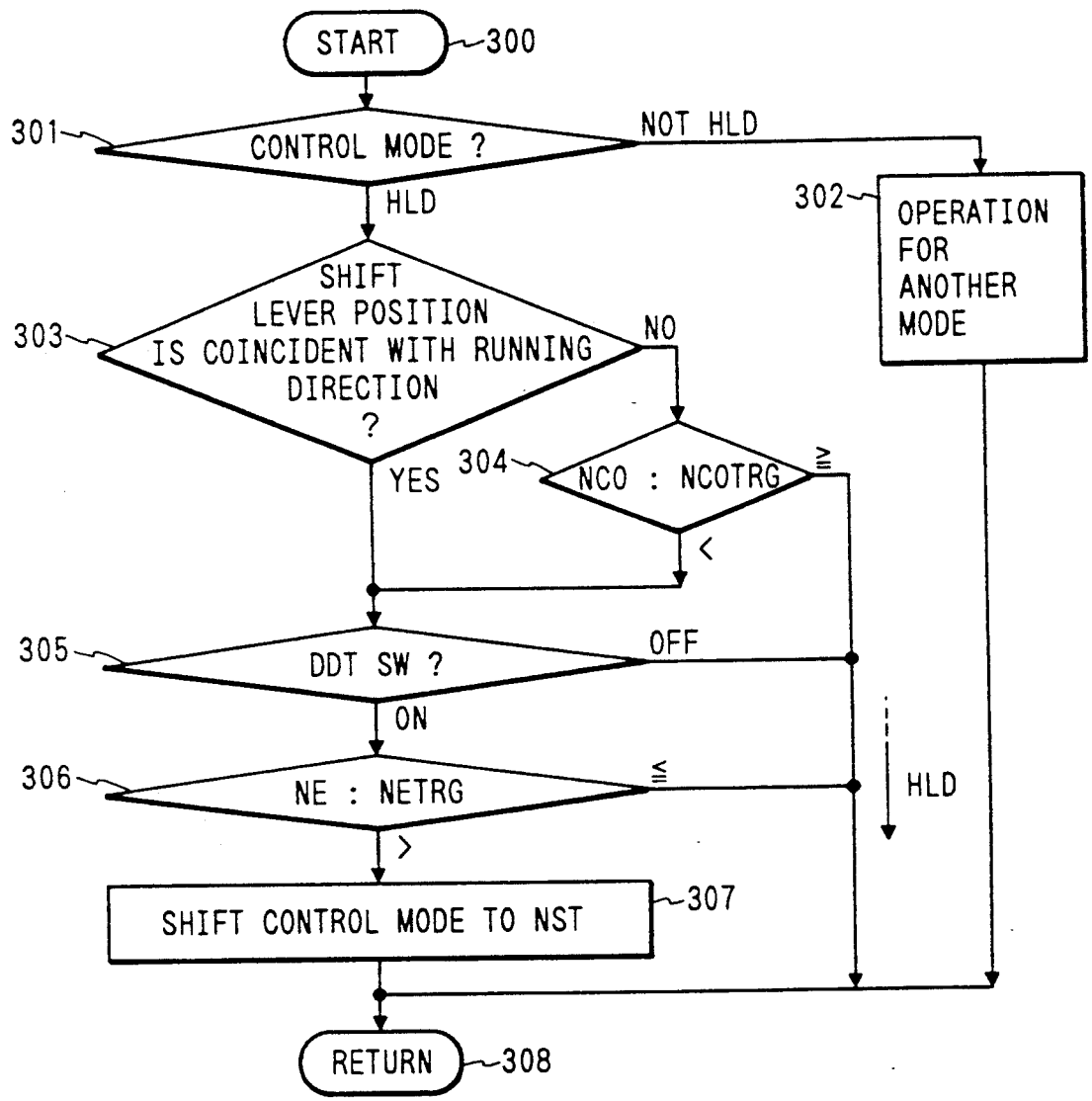
FIG. 8 is a flowchart showing the control flow by a CVT control method according to the present invention.

The control process for controlling the CVT 2 according to the invention will be described with reference to FIG. 8.

After the control process starts (step 300), the control unit 106 determines whether or not the control mode is the hold mode HLD or another mode (step 301). If it is another mode, the control unit controls the CVT according to a procedure for another mode (step 302), and goes to a RETURN step 308.

If the control mode is the hold mode HLD in step 301, the control unit determines whether or not the shift lever position is coincident with the vehicle running direction (step 303). If NO, the control unit determines whether or not wheel speed NCO is less than or more than a wheel speed trigger value NCOTRG (step 304). If the wheel speed NCO is more than the wheel speed trigger value NCOTRG, the control unit goes to step 308, while keeping the hold mode HLD.

If the shift lever position is coincident with the vehicle running direction (step 303), the control unit determines whether the driver demand switch DDT is on or off (step 305) when the wheel speed NCO is less than the wheel speed trigger value NCOTRG (step 304). If the driver demand switch DDT is off (step 305), the control unit goes to step 308, while keeping the hold mode HLD, as in the above case.

In step 305, if the driver demand switch DDT is on, the control unit 106 determines whether or not the engine speed NE is larger than or equal to the engine speed trigger value NETRG, or smaller than the same (step 306). If the engine speed NE is smaller than the engine speed trigger value NETRG, the control unit goes to the RETURN step 308, while keeping the hold mode HLD.

If the engine speed NE is larger than or equal to the engine speed trigger value NETRG (step 305), the control unit shifts the control mode to the start mode NST (step 307), and goes to the RETURN step 308.

In starting a vehicle (not shown) with the CVT 2, when the driver demand switch DDT is on and the engine speed NE is larger than or equal to the engine speed trigger value NETRG, the control unit 106 shifts the control mode from the hold mode HLD to the start mode NST. As a result, as shown in FIG. 10, the engine speed NE increases when the control mode is shifted to the start mode NST, so that the discharge flow of the oil pump 32 exceeds a predetermined value to secure an oil pressure necessary for the control. Accordingly, the oil pressure necessary for the control for starting the vehicle can be secured.

In other words, at the start of the vehicle, the hold mode HLD is maintained till the driver demand switch DDT is turned on and the engine speed NE is larger than or equal to the engine speed trigger value NETRG. As a result, the shift of the control mode from the hold mode HLD to the normal start mode NST is retarded.

When at the start of vehicle, the driver demand switch DDT is on and the engine speed NE is larger than or equal to the engine speed trigger value NETRG, the control unit 106 shifts the control mode from the hold mode HLD to the normal start mode NST. In other words, when a driver presses on the accelerator pedal of a vehicle with the CVT 2, so that the engine speed NE increases to exceed a predetermined engine speed trigger value NETRG, and the discharge flow of the oil pump 32 exceeds a predetermined value to secure an oil pressure necessary for the control, the control unit shifts the control mode from the hold mode HLD to the normal start mode NST.

When the control mode is shifted to the normal start mode NST, the engine speed NE increases, so that the discharge flow of the oil pump 32 exceeds a predetermined value to secure an oil pressure necessary for the control. Accordingly, it is possible to secure an oil pressure necessary for the control for starting the vehicle. When a driver pushes his foot down on the accelerator pedal with his intention to start, the engine speed NE necessarily increases. Therefore, the driver's will can be faithfully reflected on the control. In the internal combustion engine of low power performance, the engine speed NE slowly increases after the driver demand switch DDT is turned on. According to the control method, the engine speed NE increases while the shift to the normal start mode NST is retarded. Accordingly, the difference of the engines can be absorbed. As a result, the running feeling at the start of the vehicle is improved. The control method can be realized by merely using an additional software or modifying the already software, not using any additional hardware. In this respect, this control method requires a less increase of cost.

Second Embodiment

The second embodiment of the present invention will be described.

Figure 12:
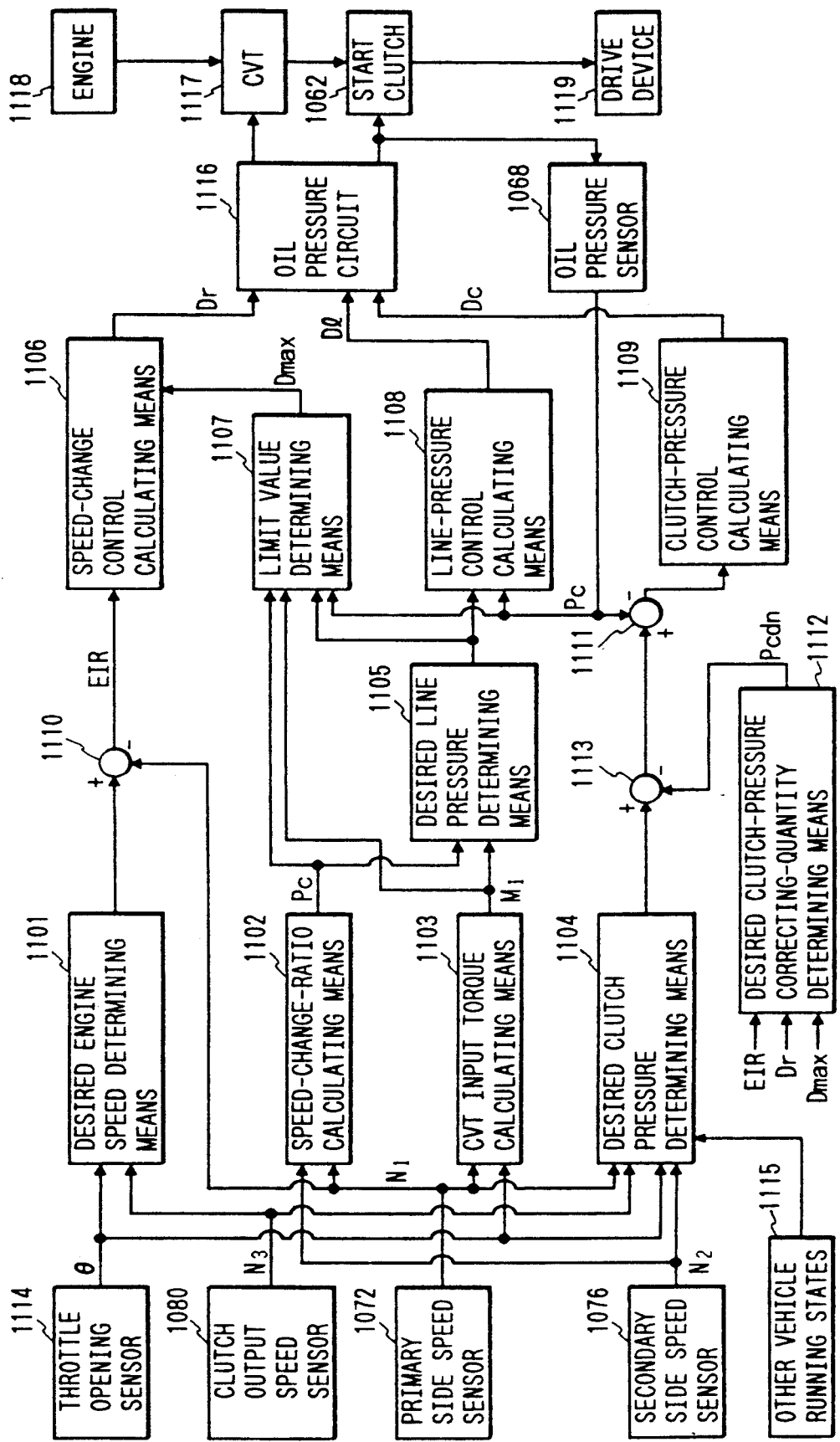
FIG. 12 is a block diagram showing the arrangement of a control unit for a continuously variable transmission according to a second embodiment of the present invention.

FIG. 12 is a block diagram showing the arrangement of a control unit for a continuously variable transmission according to a second embodiment of the present invention. A control flow of controlling a continuously variable transmission will be described with reference to FIG. 12. In the clutch control, the operation of a desired clutch pressure determining unit 1104 will be described for each mode. In a neutral mode, the clutch pressure is set to zero. In a hold mode, the clutch pressure is set to such an oil pressure as to allow the clutch to make an engagement. In a start mode, the desired clutch pressure determining means 1104 receives a throttle opening $\theta$ detected by a throttle opening sensor 1114, a clutch output speed N3=vehicle velocity V detected by a clutch output speed sensor 1080, a primary side speed N1=engine speed Ne detected by a primary side speed sensor 1072, a secondary side speed N2=clutch input speed detected by a secondary side speed sensor 1076, and other vehicle running states 1115. On the basis of those items of data, the desired clutch pressure determining means 1104 determines a desired clutch pressure. An oil pressure Pc of a start clutch 1062 senses an oil pressure sensor 1068. A desired clutch pressure and the sensed oil pressure Pc are input to a subtractor 1111. The difference of them is input to a clutch-pressure control calculating means 1109. Responsively, the clutch-pressure control calculating means 1109 produces a duty Dc as a manipulated variable, which in turn is input to an oil pressure circuit 1116. Then, the oil pressure of the start clutch 1062 is controlled to be a desired clutch pressure. In a drive mode, the clutch pressure is controlled basically to be equal to the line pressure. In a hold mode, the clutch pressure is set to such a value as to allow the clutch to slightly slip.

Figure 13:
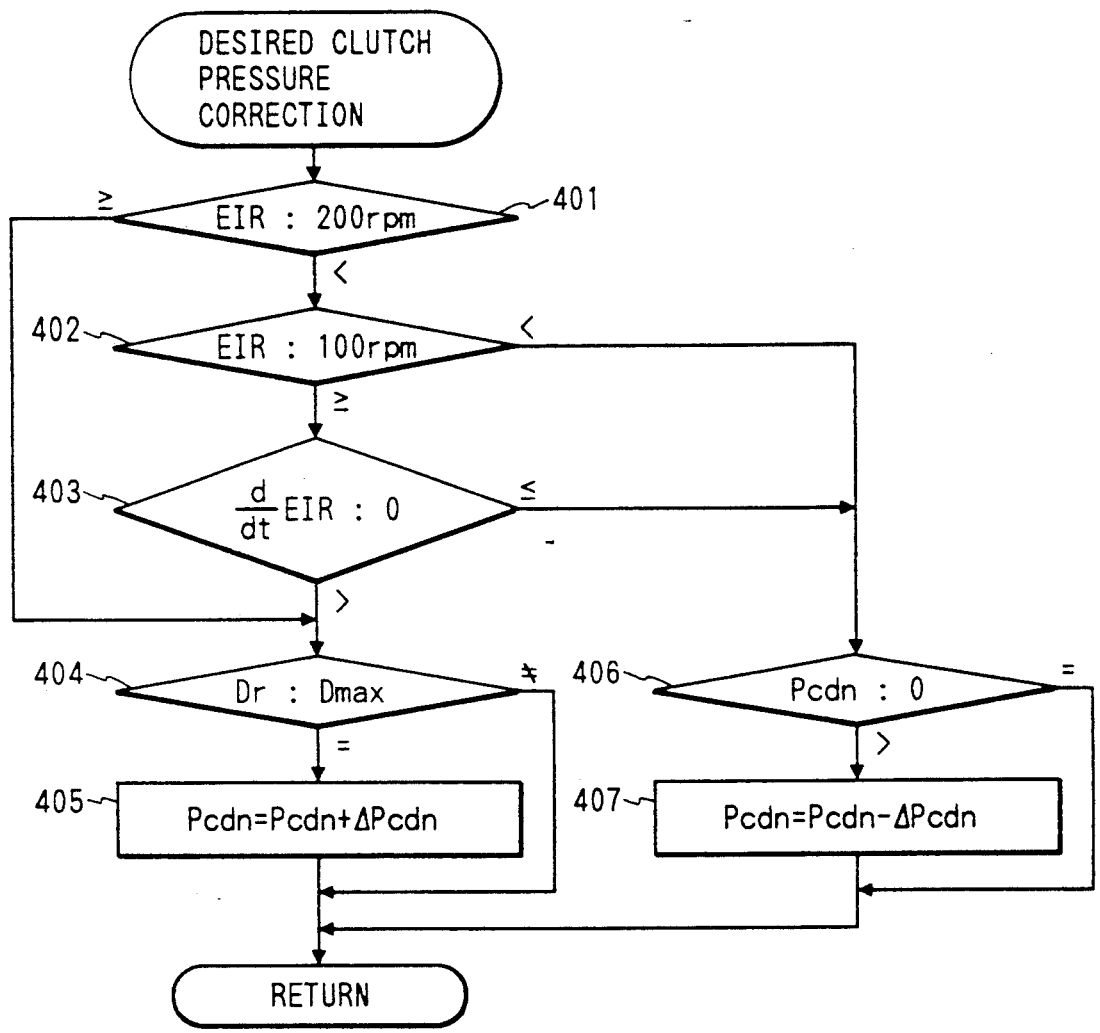
FIG. 13 is a flowchart showing the operation of a desired clutch pressure correcting-quantity determining means used in the control device of FIG. 12.

A desired clutch-pressure correcting-quantity determining means 1112 can control an input torque of a CVT 1117 by changing the clutch pressure, and serves as an input torque correcting means. FIG. 13 is a flow-chart showing the operation of a desired clutch pressure correcting-quantity determining means 1112 used in the control device. In step 401, the determining means 1112 checks whether or not the difference EIR between the desired engine speed and the detected engine speed NE exceeds 200 rpm. If it is smaller than 200 rmp, the determining means checks whether or not it exceeds 100 rpm in step 402. In the next step 403, the determining means checks whether the direction of dEIR/dt, or change of the difference or error EIR, is positive or negative. If the direction is positive, the determining means advances to step 404.

In step 404, the determining means determines whether or not the duty Dr output from a speed-change control calculating means 1106 is being limited (Dr Dmax, Dmax: duty limit value). If it is being limited, the determining means in step 405 decides that the present correcting quantity Pcdn is equal to the result of adding a given decremental quantity ΔPcdn to the previous correcting quantity Pcdn. If the error EIR is smaller than 100 rpm or EIR/dt is negative, the determining means goes to step 406. In this step, the determining means judges whether the present correcting quantity Pcdn is zero or positive. If it is positive, the determining means in step 407 subtracts the decremental quantity ΔPcdn from the previous correcting quantity Pcdn, and threats the result of subtraction as the present correcting quantity.

In the control of line pressure, a speed-change-ratio calculating means 1102 receives the primary side speed N1 and the secondary side speed N2, and calculates a speed change ratio Rc=N1/N2. A CVT input torque calculating means 1103 receives a throttle opening θ and an engine speed Ne=N1, and calculates a primary side torque M1. A desired line pressure determining means 1105 receives a speed change ratio Rc and a primary side torque M1, and determines a desired line pressure Plsp. A line-pressure control calculating means 1108 receives a desired line pressure Plsp and an oil pressure Pc, and calculates a duty D1 of a manipulated variable and outputs it to the oil pressure circuit 1116. When the oil pressure Pc is not equal to the line pressure (in a clutch disengagement state), it produces a duty corresponding to a desired line pressure.

Third Embodiment

The third embodiment of the present invention will be described.

Figure 14:
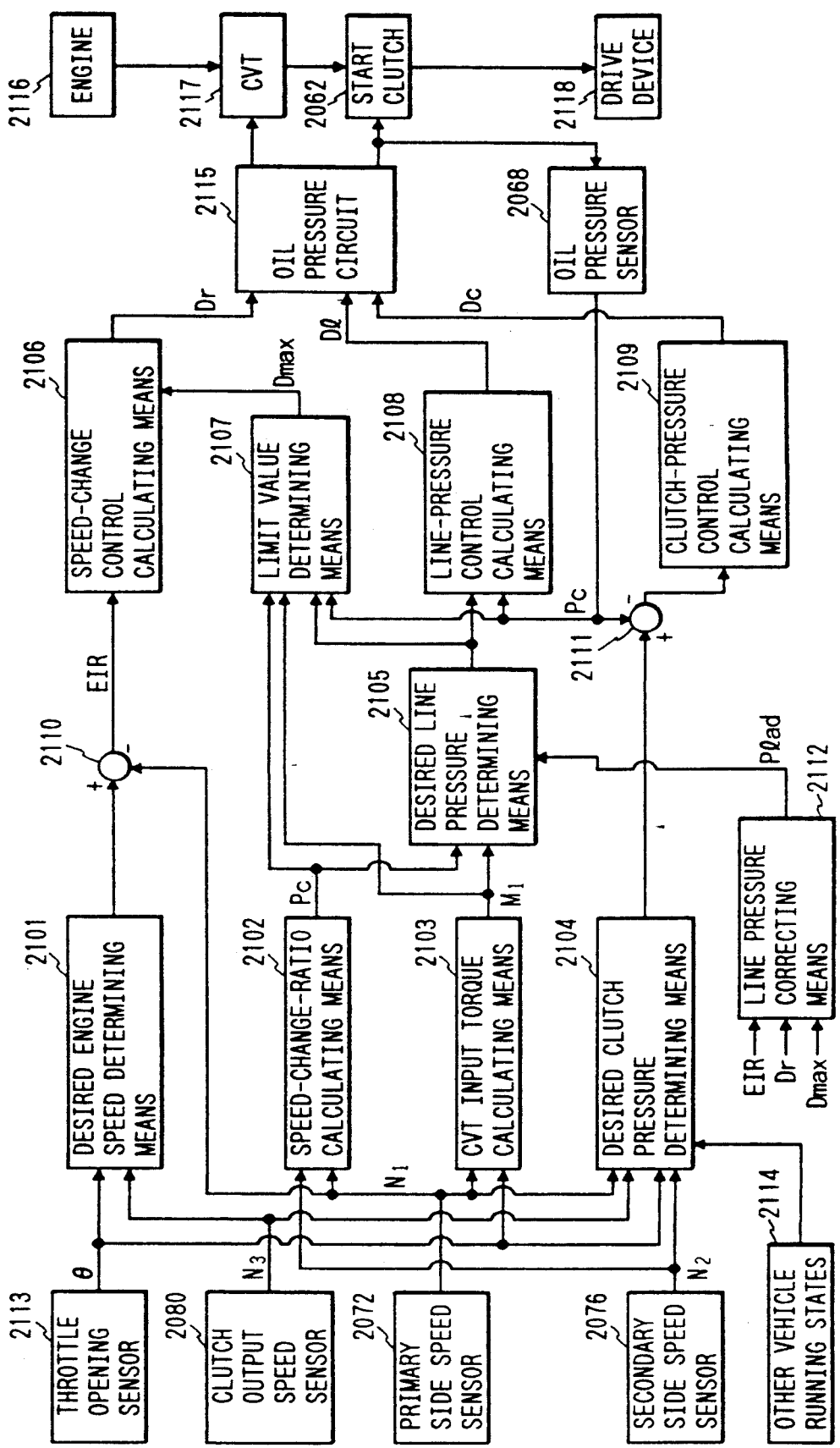
FIG. 14 is a block diagram showing the arrangement of the control unit for a continuously variable transmission according to a third embodiment of the present invention.

FIG. 14 is a block diagram showing the arrangement of a control unit for a continuously variable transmission according to a third embodiment of the present invention. A control flow of controlling a continuously variable transmission will be described with reference to FIG. 14. In the clutch control, a desired clutch pressure determining means 2104 receives a throttle opening θ detected by a throttle opening sensor 2113, a clutch output speed N3=vehicle velocity V detected by a clutch output speed sensor 2080, a primary side speed N1=engine speed Ne detected by a primary side speed sensor 2072, a secondary side speed N2=clutch input speed detected by a secondary side speed sensor 2076, and other vehicle running states 2114. On the basis of those items of data, the desired clutch pressure determining means 2104 determines a desired clutch pressure. An oil pressure Pc of a start clutch 2062 senses an oil pressure sensor 2068. A desired clutch pressure and the sensed oil pressure Pc are input to a subtractor 2111. The difference between them is applied to a clutch-pressure control calculating means 2109. Responsively, the clutch-pressure control calculating means 2109 produces a duty Dc as a manipulated variable, which in turn is input to an oil pressure circuit 2115. Then, the oil pressure of the start clutch 2062 is controlled to be a desired clutch pressure.

In the control of line pressure, a speed-change-ratio calculating means 2102 receives the primary side speed N1 and the secondary side speed N2, and calculates a speed change ratio Rc=N1/N2. A CVT input torque calculating means 2103 receives a throttle opening θ and an engine speed Ne=N1, and calculates a primary side torque M1. A desired line pressure determining means 2105 receives a speed change ratio Rc and a primary side torque M1, and determines a desired line pressure Plspl. A line pressure correcting means 2112 receives a duty Dr and the error EIR between the output data of a desired engine speed determining means 2101 and the output Ne of the primary side speed sensor 2072, and calculates a line correcting value Plad. The line correcting value Plad is input to the desired line pressure determining means 2105 where it is added to the desired line pressure Plspl, thereby forming a desired line pressure Plsp. A line-pressure control calculating means 2108 receives the desired line pressure Plsp and an oil pressure Pc, and calculates a duty D1 of a manipulated variable and outputs it to the oil pressure circuit 2115. When the oil pressure Pc is not equal to the line pressure (in a clutch disengagement state), it produces a duty corresponding to a desired line pressure.

Figure 15:
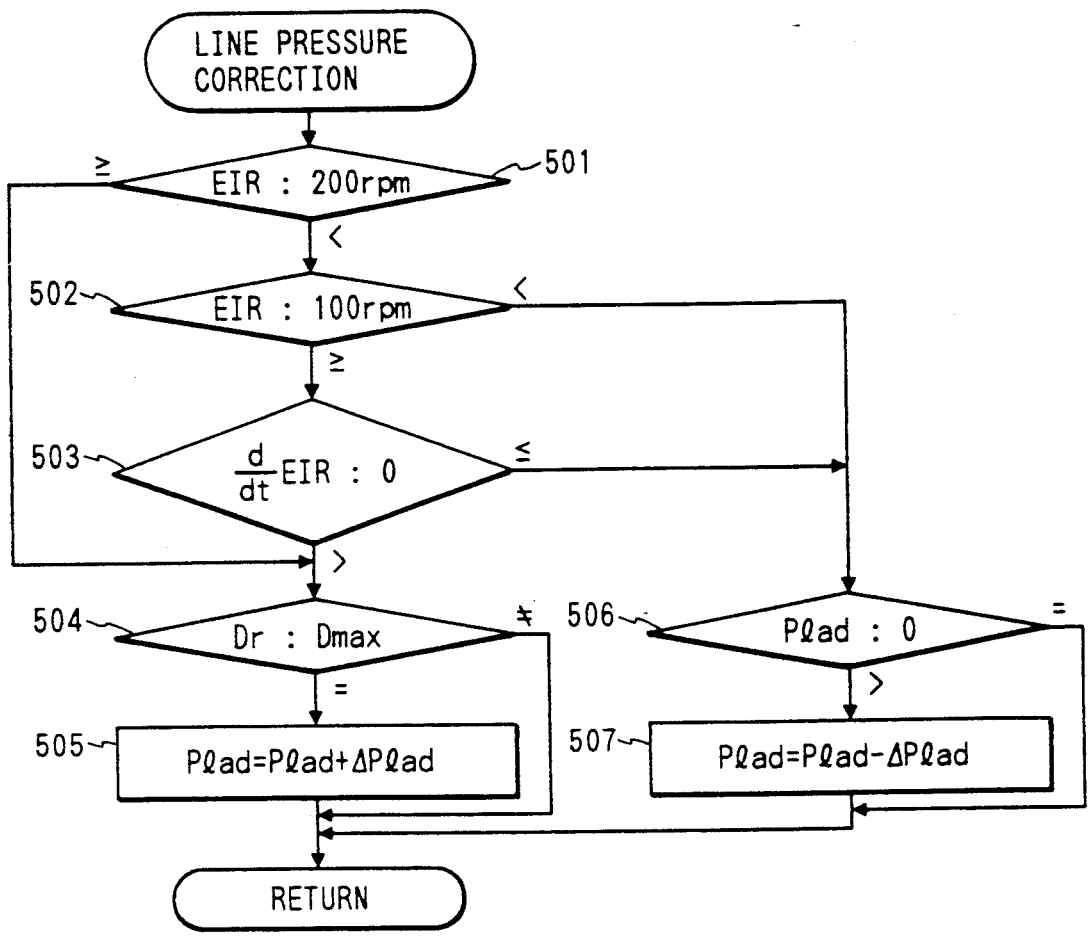
FIG. 15 is a flowchart showing the operation of a line pressure correcting means used in the control unit of FIG. 14.

FIG. 15 is a flowchart showing the operation of the line pressure correcting means 2112. In step 501, the correcting means 2112 checks whether or not the difference EIR exceeds 200 rpm. If it is smaller than 200 rmp, the correcting means checks whether or not it exceeds 100 rpm in step 502. If it exceeds 100 rpm, the correcting means, in the next step 503, checks whether the direction of dEIR/dt, or change of the difference EIR, is positive or negative. If the direction is positive, the correcting means advances to step 504. In this step, the correcting means determines whether or not the duty Dr is being limited (Dr=Dmax). If it is being limited, the correcting means in step 505 adds a given incremental quantity ΔPlad to the previous correcting quantity Plad, to form the present correcting quantity. If the difference EIR is smaller than 100 rpm or dEIR/dt is negative, the correcting means goes to step 507. In this step, the correcting means subtracts the incremental quantity ΔPlad from the previous correcting quantity Plad, to form the present correcting quantity.

In the speed change control by the control unit according to the second and third embodiments, the desired engine speed determining means 1101 (2101) determines a desired engine speed Nesp on the basis of the throttle opening θ and the vehicle velocity V. The desired engine speed Nesp and the engine speed Ne are input to the subtractor 1110 (2110). The difference EIR derived from the subtractor is input to the speed-change control calculating means 1106 (2106). The calculating means outputs a duty Dr as a manipulated variable. With the duty, the CVT 1117 (2117) is speed-change controlled through the oil pressure circuit 1119 (2119). Reference numeral 1118 (2118) designates an engine, and numeral 1119 (2119), a drive device.

Figure 16:
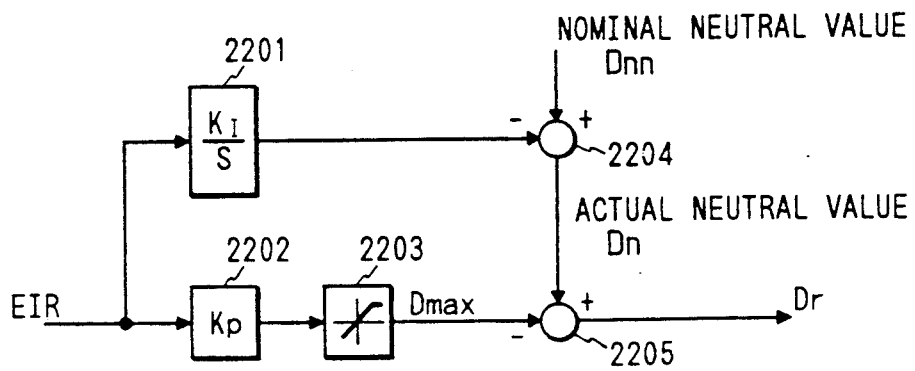
FIG. 16 is a block diagram showing the arrangement of a speed change control calculating means which may be used in the control unit of the invention.

The duty Dr output from the speed-change control calculating means 1106 (2106) is limited by a duty limit value Dmax that is determined by the limit value determining means 1107 (2107). FIG. 16 is a block diagram showing the arrangement of a speed-change control calculating means 1106 (2106) which may be used in the control device of the invention. In the speed-change control calculating means based on the proportional-integral control, the output from an integrator 2201 of an integration gain K1 is subtracted from a nominal neutral value Dnn in a subtractor 2204, thereby obtaining an actual neutral value Dn. The output of a proportional calculator 2202 of a proportional gain Kp is limited by a limit value Dmax of a limiter 3203. A subtractor 2205 subtracts the output of the limiter 2203 from the actual neutral value Dn, and outputs the result as a duty Dr.

Figure 17:
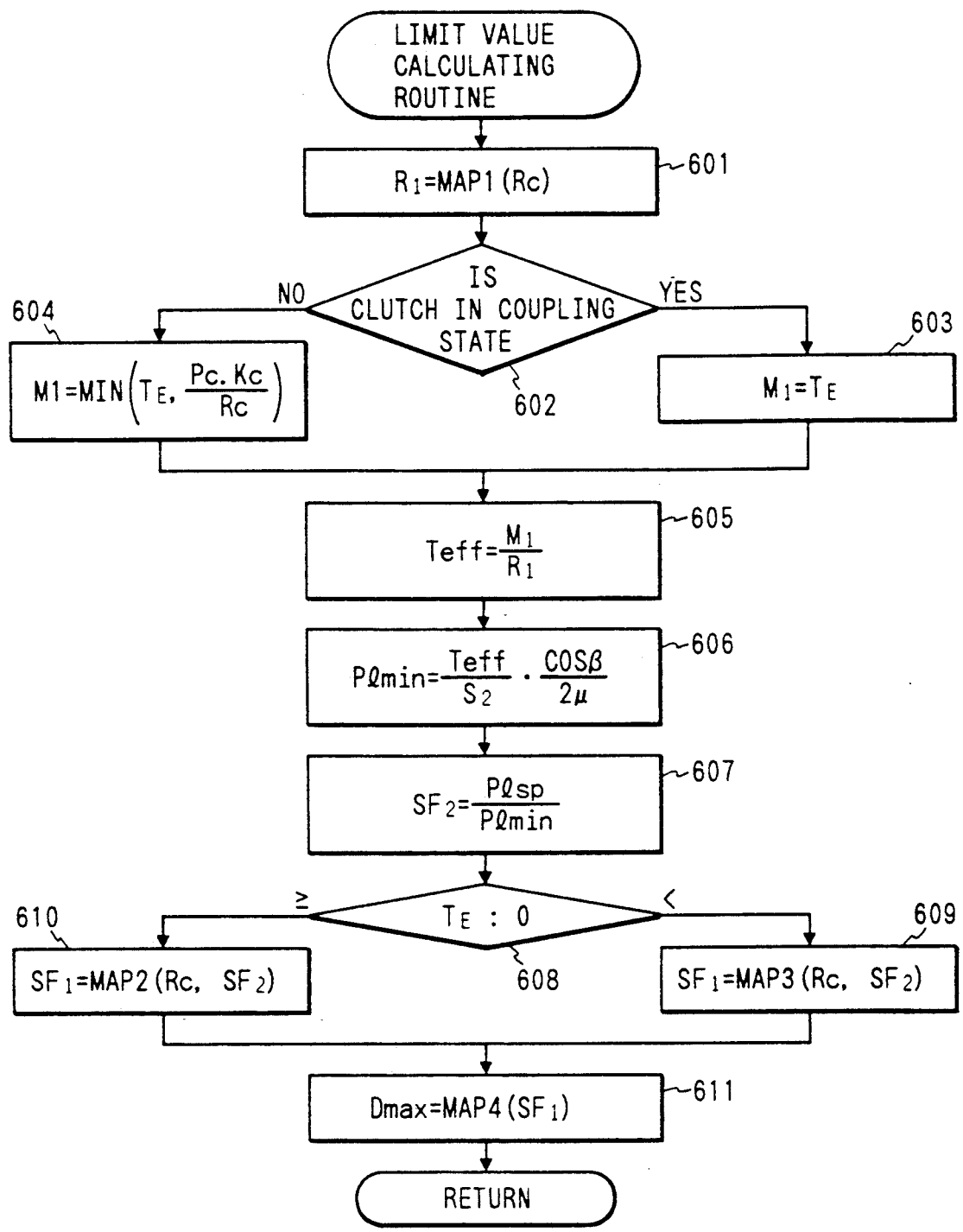
FIG. 17 is a flowchart showing the operation of a limit value determining means used in the control unit of the invention.

FIG. 17 is a flowchart showing the operation of a limit value determining means 1107 (2107) used in the control unit of the invention. In step 601, the limit value determining means calculates a value R1 using a map MAP1 containing the relationship between a speed change ratio Rc and a radius R1. In step 602, it determines whether the clutch is in a coupling state or a decoupling state. If it is in a coupling state, the limit value determining means goes to step 603 where the primary torque M1=TE is set up. If it is in a decoupling state, the determining means goes to step 604 where the TE is compared with (Pc×Kc)/Rc, and the smaller of the two compared is treated as the primary side torque M1. Here, Pc is the clutch pressure and Kc represents a clutch gain (torque/pressure). The product of multiplying the Pc and Kc is the secondary torque.

Figure 1:
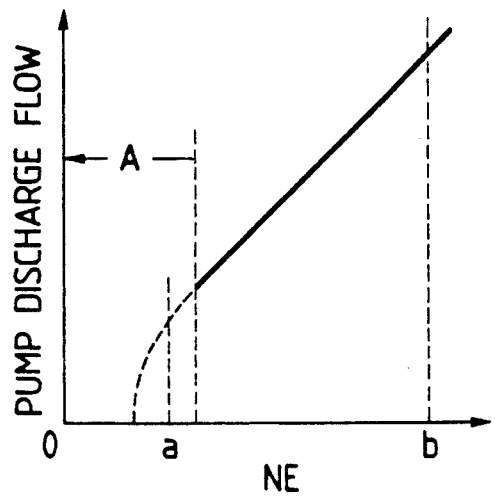
FIG. 1 is a graphical representation of the relationship of discharge flow of an oil pump vs. engine speed.
Figure 2:
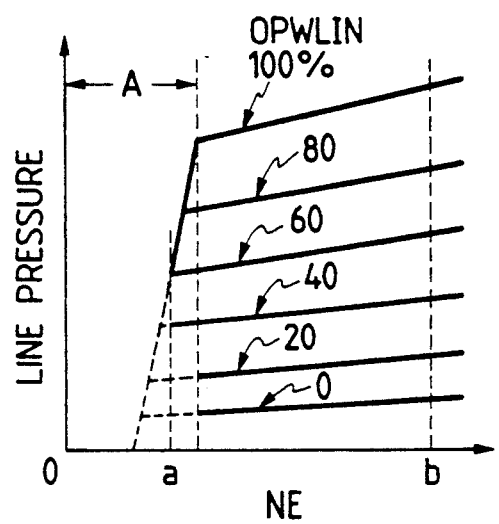
FIG 2 is a graphical representation of the relationship of line pressure vs. engine speed.
Figure 3:
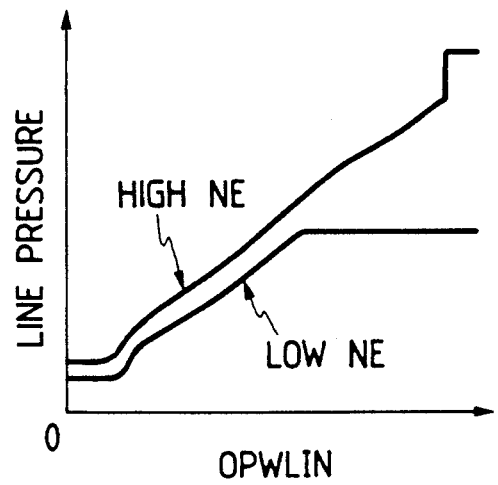
FIG. 3 is a graphical representation of the relationship of line pressure vs. line pressure solenoid duty.
Figure 4:
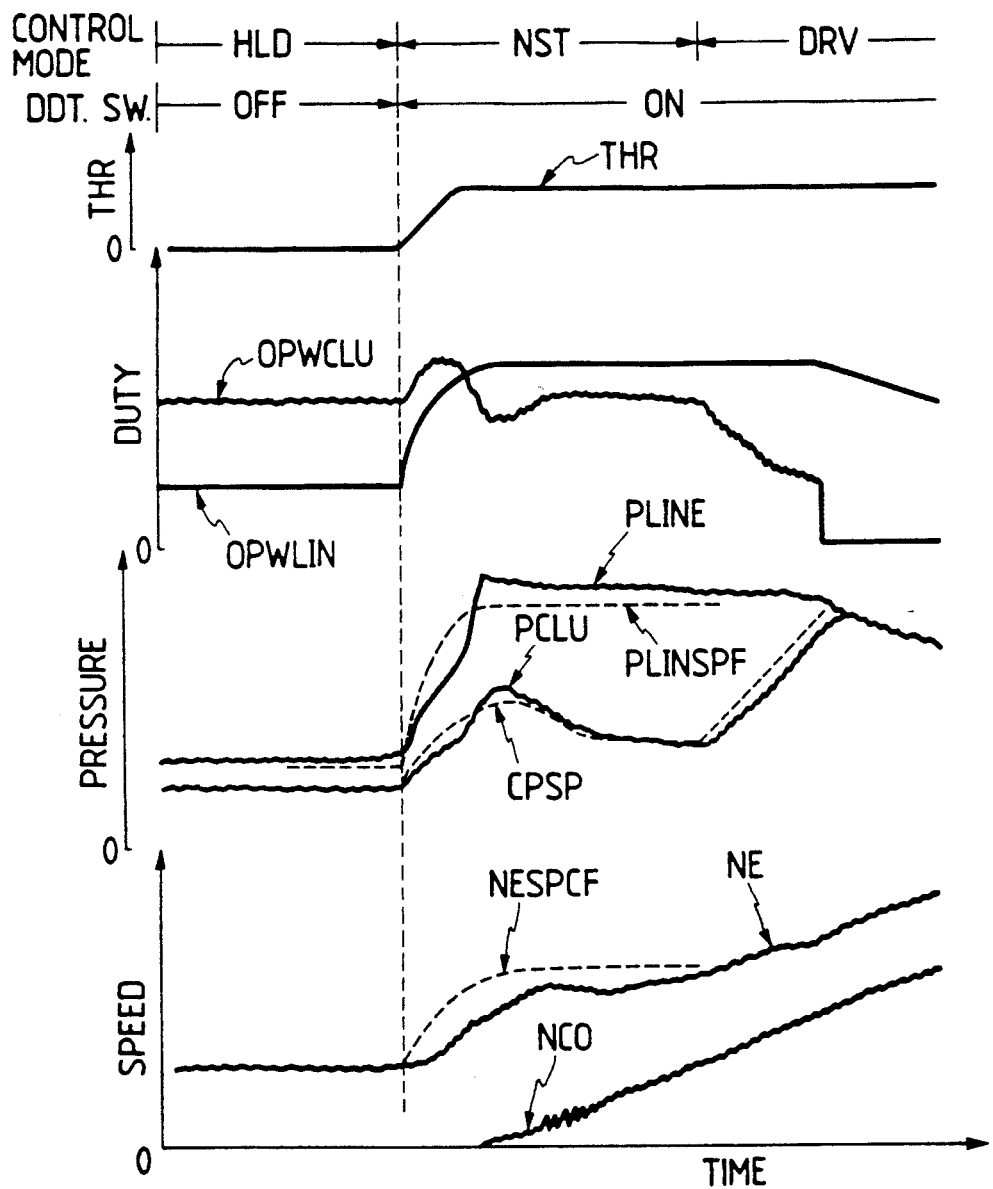
FIG. 4 is a timing chart showing a conventional control method of controlling a continuously variable transmission.
Figure 5:
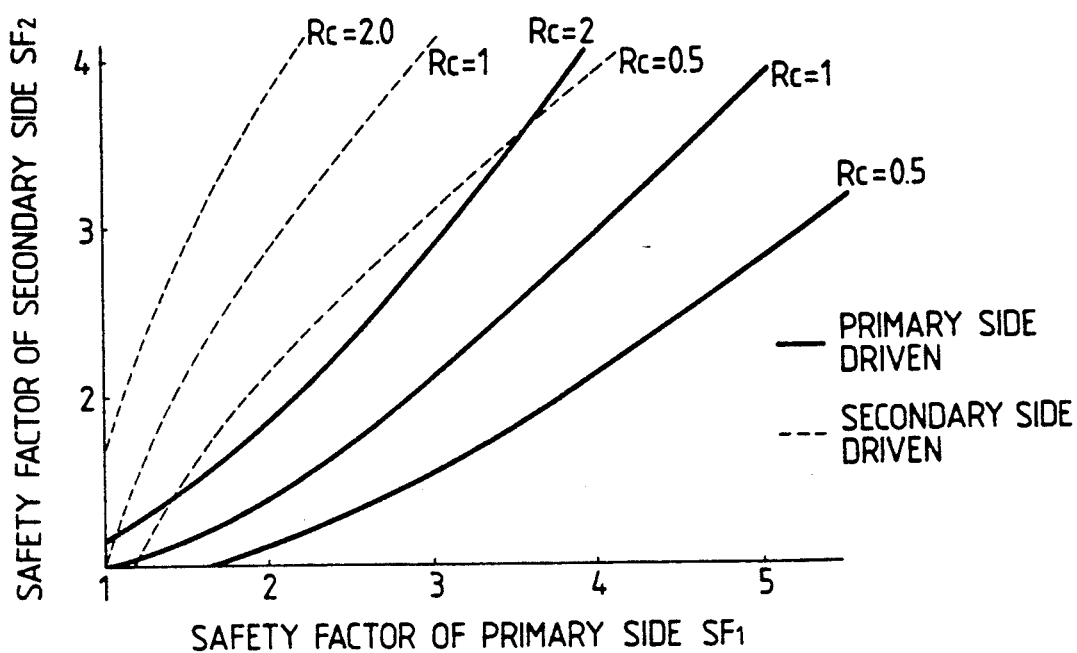
FIG. 5 is a graph showing the relationship of secondary safety factor vs. primary safety factor, with a parameter of a speed change ratio.
Figure 7:
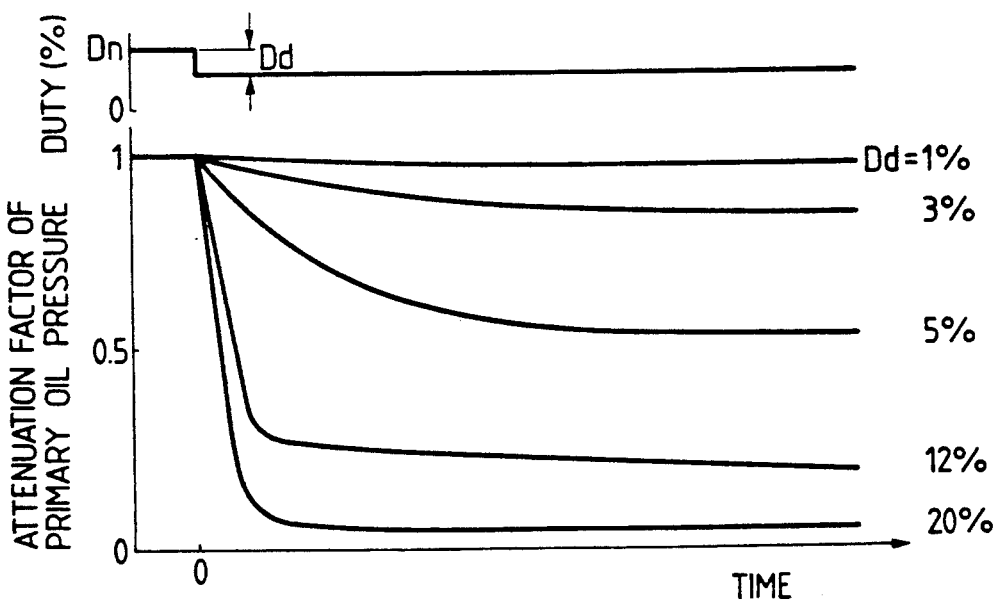
FIG. 7 is a graph showing a step response of the primary oil pressure.
Figure 6:
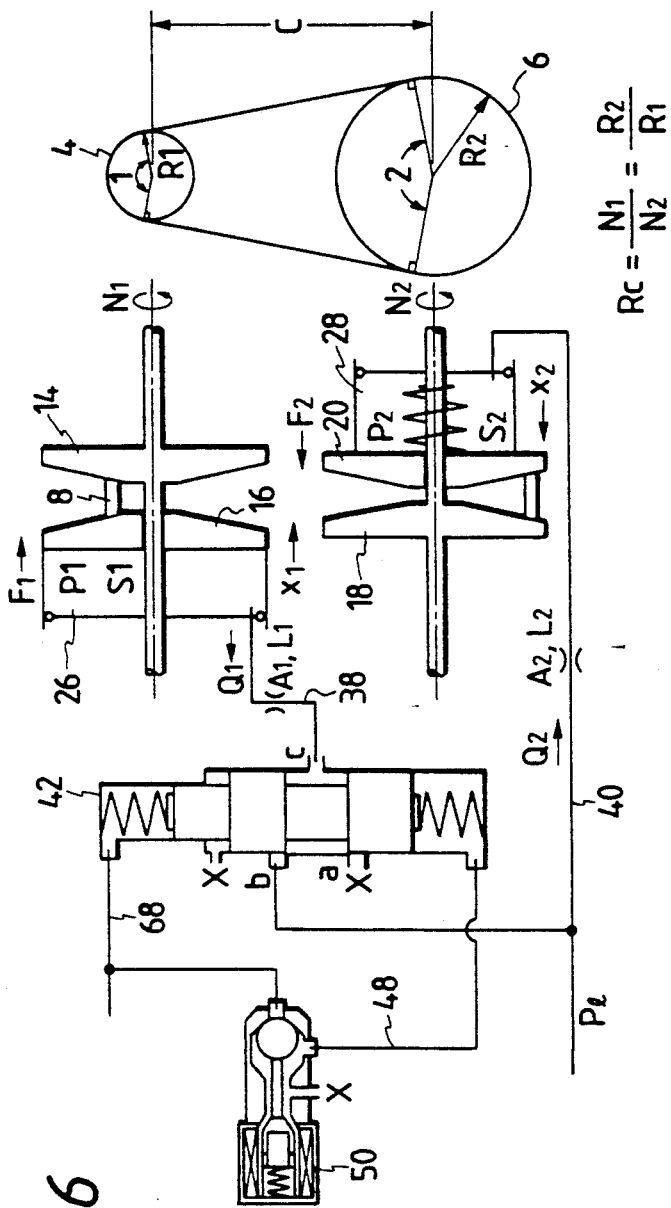
FIG. 6 is an oil-pressure circuit diagram related to the speed change control according to the present invention.
Figure 18:
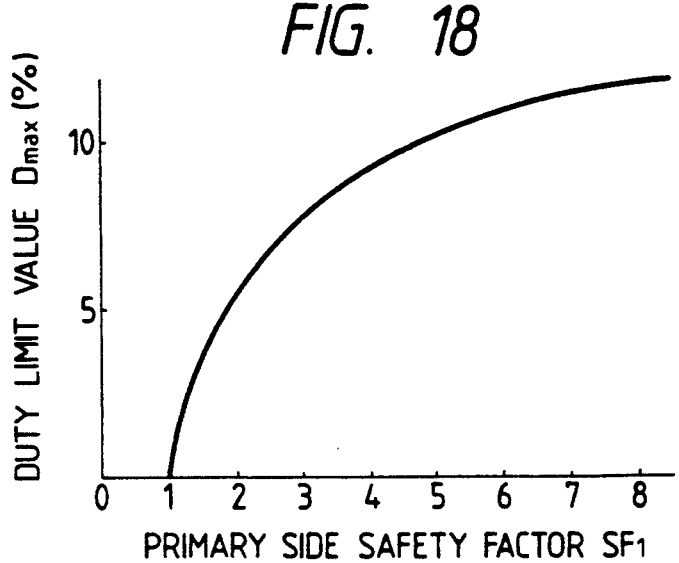
FIG. 18 is a graph showing the relationship of duty limit value vs. primary safety factor.

In step 605, an effective tension Teff M1/R1 is calculated. In step 607, the secondary side safety factor SF2 Plsp/Plmin is calculated. In step 608, the limit value determining means determines whether the TE is positive or negative. If it is negative, or in the secondary side drive mode, step 609 is executed to calculate the primary side safety factor SF1 using the relationship map MAP3 indicated by broken lines in FIG. 5. If the TE is positive or zero, or in the primary side drive mode, step 610 is executed to calculate the primary side safety factor SF1 using a relationship MAP2 indicated by solid lines in FIG. 5. Step 611 is executed to calculate a duty limit value Dmax using the safety factor SF1 in a stationary state and a MAP4 shown in FIG. 18 so as to keep at least 1 of the safety factor in a transient state. In FIG. 18, there is depicted the relationship of the duty limit value Dmax vs. the primary side safety factor SF1 on the assumption that the reciprocal of the primary oil pressure settled down to be substantially constant in FIG. 7 is equal to the primary side safety factor.

In the second and third embodiments of the invention, the engine, CVT, and start clutch are coupled in this order. The order of the engine, start clutch, and CVT is also available. The start clutch described was of the wet type; however, it may be of the electromagnet type or the fluid type. In step 307 of FIG. 17, the clutch torque can be estimated on the basis of, for example, the current value in the case of the electromagnetic clutch. In the case of the fluid clutch, a capacitance coefficient as the function of a speed ratio, for example, and the input speed are used for its estimation. The determination as to whether the primary side is the drive side or the driven side in step 308 in FIG. 17 can be made on the basis of the sign of the difference between the input speed of clutch and the output speed. In the embodiments as stated above, the primary side safety factor in a transient state is set to at least 1. To ensure a more reliable safety, it is preferable that the safety factor is set to more than 1.

Fourth Embodiment

Where a quick speed change is required (for example, the deviation in the speed change control is large and the manipulated variable is limited), in order to increase the manipulated variable limit value Dmax, the second embodiment controls the clutch pressure to decrease the clutch transmission torque, and hence to reduce the input torque by a necessary quantity. The input torque can be reduced by reducing the engine output.

Figure 19:
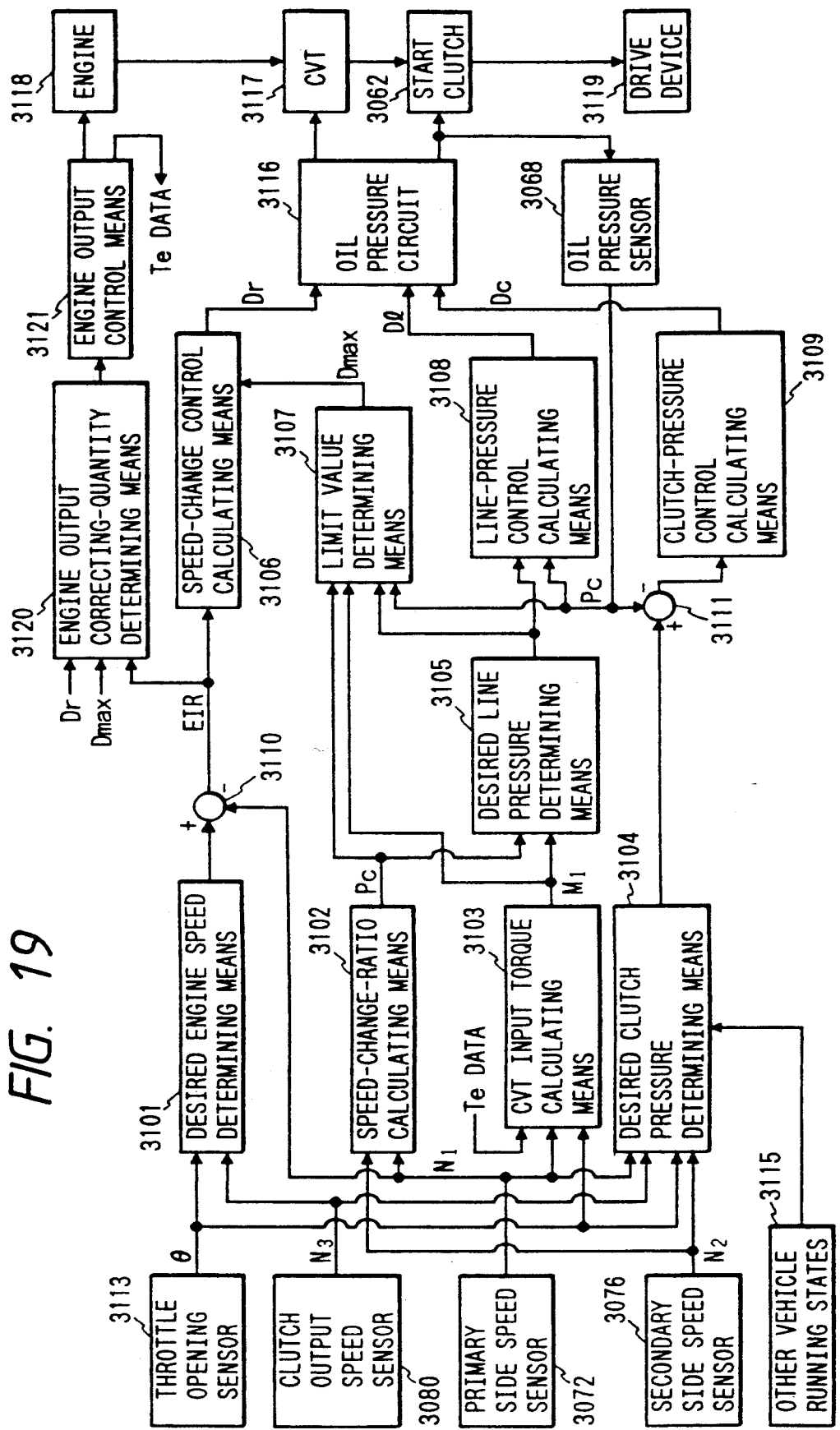
FIG. 19 is a block diagram showing the arrangement of a control unit for a continuously variable transmission according to a fourth embodiment of the present invention.

FIG. 19 is a block diagram showing another arrangement of the control unit 106 for a continuously variable transmission according to a fourth embodiment of the present invention. In the figure, an engine output correcting-quantity determining means 3120 receives the difference EIR, duty limit value Dmax, and duty Dr, and determines a torque adjust quantity. The same instructs an engine output control means 3121 for controlling an engine 3118 to correct an input torque to the CVT 3117. Specifically, engine torque data TE is input from the engine output control means 3121 to a CVT input torque calculating means 3103, and is used for the calculation of the primary side torque M1. Thus, the engine output correcting-quantity determining means 3120 and the engine output control means 3121 make up an input torque correcting means.

Figure 20:
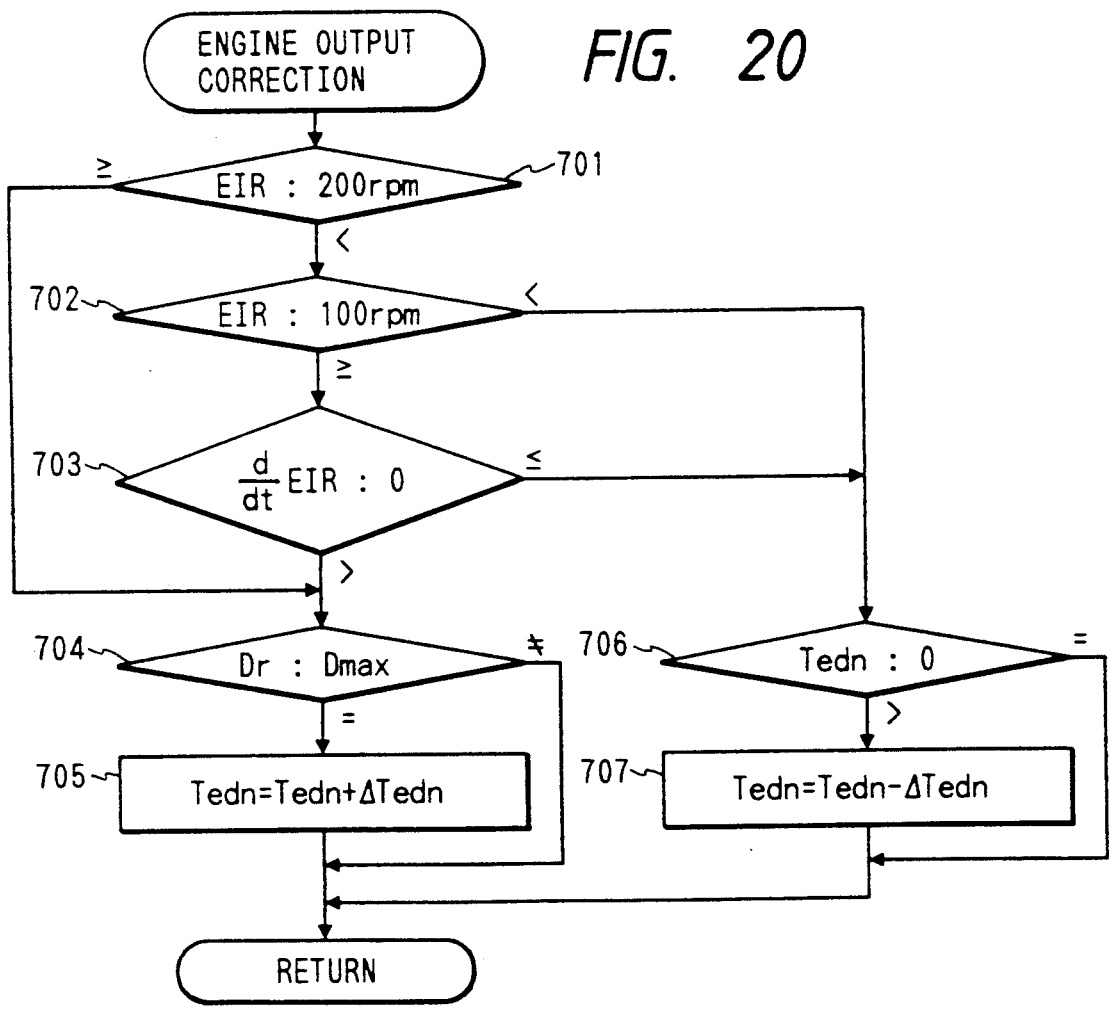
FIG. 20 is a flowchart showing the operation of an engine output correcting-quantity determining means used in the control unit of FIG. 19.

FIG. 20 is a flowchart showing the operation of the engine output correcting-quantity determining means 3120. The engine output correcting-quantity determining means takes a control flow which is substantially equal to that of FIG. 13. In this flow, a correcting quantity Eedn is determined.

With the construction of the first aspect of the invention, when a driver pushes his foot on the accelerator pedal of a vehicle carrying the continuously variable transmission with his intention to start the vehicle, the engine speed increases to exceed a preset value, so that an amount of discharge flow of an oil pump for generating an oil pressure exceeds a preset value at which an oil pressure necessary for control is secured, the control means operates to shift the control mode from a hold mode to a start mode. Thus, when the control mode is shifted to the start mode, an amount of discharge flow of an oil pump for generating an oil pressure has exceeded a preset value at which an oil pressure necessary for control is secured, as the result of increase of the engine speed. Accordingly, an oil pressure necessary for control can be reliably secured.

According to the second aspect of the invention, the safety factor in a stationary state is calculated using the effective tension of the CVT belt, secondary side oil pressure, and the speed change ratio. Using the calculated stationary state safety factor, a manipulated variable previously gained, and a changing rate of the primary oil pressure, calculation is carried out to obtain a limit manipulated variable so that a safety factor in a speed changing state (transient state) exceeds a predetermined value. With the limit manipulated variable thus obtained, a manipulated variable when the speed change control progresses is limited, so that the CVT belt slip caused by the primary side oil pressure drop owing to an excessive manipulated variable, can be reliably removed. Further, the input torque correcting means for correcting the CVT input torque or the line pressure correcting means for correcting a line pressure only when required is provided. Provision of the correcting means eliminates the degradation of the speed change control performance, which is due to the limitation of the manipulated variable. Further, since the control unit is implemented using the electronic technique, the resultant control unit is low in cost and high in accuracy.

While the preferred embodiments of the invention have been described, it is to be distinctly understood that the invention is not limited thereto but may be otherwise variously embodied within the scope of the following claims.

What is claimed is:

1. A continuously variable transmission including primary and secondary pulleys of which effective diameters are continuously variable, and a drive belt wound around the primary and secondary pulleys, a line pressure generated by a pressure source is supplied to one of pressure servos of the primary and secondary pulleys, thereby generating a second gripping force of the drive belt, the line pressure is selectively supplied to the other pressure servo, thereby generating a speed change pressure and to generate a first gripping force of the drive belt, and a speed change ratio is controlled by shifting the movable pulley parts in the axial direction, said control device comprising:

line pressure control means for controlling a line pressure to a desired line pressure that is determined on the basis of data from a vehicle running state detecting means;

a speed change control means for controlling the engine speed to a desired speed change ratio or a desired engine speed that is determined on the basis of the data;

first calculating means for calculating a minimum belt gripping force using an effective belt tension as the ratio of a transmission torque and the effective diameter;

second calculating means for calculating a second gripping force using the line pressure;

third calculating means for calculating a first gripping force in an equilibrium state where a speed change ratio is substantially constant, using the outputs of said first and second calculating means and a speed change ratio;

determining means for determining the relationship of a change rate of the first gripping force and a manipulated variable of a speed change control means;

fourth calculating means for calculating a second gripping force value in a speed changing state using the determined relationship and the output data from said third calculating means;

limiting means for limiting the manipulated variable of said speed change control means so that the ratio of the output data of said fourth calculating means to the output data of the first calculating means exceeds a fixed value; and input torque correcting means for correcting an input torque of the continuously variable transmission according to the manipulated variable limiting data of said speed change control means.

2. A continuously variable transmission including primary and secondary pulleys of which effective diameters are continuously variable, and a drive belt wound around the primary and secondary pulleys, a line pressure generated by a pressure source is supplied to one of pressure servos of the primary and secondary pulleys, thereby generating a second gripping force of the drive belt, the line pressure is selectively supplied to the other pressure servo, thereby generating a speed change pressure and to generate a first gripping force of the drive belt, and a speed change ratio is controlled by shifting the movable pulley parts in the axial direction, said control device comprising:

line pressure control means for controlling a line pressure to a desired line pressure that is determined on the basis of data from a vehicle running state detecting means;

a speed change control means for controlling the engine speed to a desired speed change ratio or a desired engine speed that is determined on the basis of the data;

first calculating means for calculating a minimum belt gripping force using an effective belt tension as the ratio of a transmission torque and the effective diameter;

second calculating means for calculating a second gripping force using the line pressure;

third calculating means for calculating a first gripping force in an equilibrium state where a speed change ratio is substantially constant, using the outputs of said first and second calculating means and a speed change ratio;

determining means for determining the relationship of a change rate of the first gripping force and a manipulated variable of a speed change control means;

fourth calculating means for calculating a second gripping force value in a speed changing state using the determined relationship and the output data from said third calculating means;

limiting means for limiting the manipulated variable of said speed change control means so that the ratio of the output data of said fourth calculating means to the output data of the first calculating means exceeds a fixed value; and line-pressure correcting means for correcting a line pressure according to the manipulated variable limiting data of said speed change control means, in place of said input torque correcting means.

3. A method of controlling a continuously variable transmission including primary and secondary pulleys of which effective diameters are continuously variable, and a drive belt wound around the primary and secondary pulleys, a line pressure generated by a pressure source is supplied to one of pressure servos of the primary and secondary pulleys, thereby generating a second gripping force of the drive belt, the line pressure is selectively supplied to the other pressure servo, thereby generating a speed change pressure and to generate a first gripping force of the drive belt, and a speed change ratio is controlled by shifting the movable pulley parts in the axial direction, said control method comprising the steps of:

controlling a line pressure to a desired line pressure that is determined on the basis of data of a vehicle running state;

controlling the engine speed to a desired speed change ratio or a desired engine speed that is determined on the basis of the data;

calculating a minimum belt gripping force using an effective belt tension as the ratio of a transmission torque and the effective diameter;

calculating a second gripping force using the line pressure;

calculating a first gripping force in an equilibrium state where a speed change ratio is substantially constant, using the minimum belt gripping force and a second gripping force and a speed change ratio;

determining the relationship of a change rate of the first gripping force and a manipulated value of a speed change control;

calculating a second gripping force value in a speed changing state using the determined relationship and the output data from said a first gripping force;

limiting the manipulated value of said speed change control so that the ratio of the second gripping force value to the minimum belt gripping force exceeds a fixed value; and correcting an input torque of the continuously variable transmission according to the manipulated value limiting data of said speed change control means.

4. A method of controlling a continuously variable transmission including primary and secondary pulleys of which effective diameters are continuously variable, and a drive belt wound around the primary and secondary pulleys, a line pressure generated by a pressure source is supplied to one of pressure servos of the primary and secondary pulleys, thereby generating a second gripping force of the drive belt, the line pressure is selectively supplied to the other pressure servo, thereby generating a speed change pressure and to generate a first gripping force of the drive belt, and a speed change ratio is controlled by shifting the movable pulley parts in the axial direction, said control method comprising the steps of:

controlling a line pressure to a desired line pressure that is determined on the basis of data of a vehicle running state;

controlling the engine speed to a desired speed change ratio or a desired engine speed that is determined on the basis of the data;

calculating a minimum belt gripping force using an effective belt tension as the ratio of a transmission torque and the effective diameter;

calculating a second gripping force using the line pressure;

calculating a first gripping force in an equilibrium state where a speed change ratio is substantially constant, using the minimum belt gripping force and a second gripping force and a speed change ratio;

determining the relationship of a change rate of the first gripping force and a manipulated value of a speed change control;

calculating a second gripping force value in a speed changing state using the determined relationship and the output data from said a first gripping force;

limiting the manipulated value of said speed change control so that the ratio of the second gripping force value to the minimum belt gripping force exceeds a fixed value; and correcting a line pressure according to the manipulated value limiting data of said speed change control.

* * * * *